United States Patent
Steinbach et al.

(10) Patent No.: US 8,027,857 B2
(45) Date of Patent: Sep. 27, 2011

(54) ROUGH-CUT MANUFACTURING OPERATIONS FOR USE IN PLANNING

(75) Inventors: Jochen Steinbach, Bad Schoenborn (DE); Klaus Reinelt, Kraichtal (DE); Tesfaldet Negash, Leimen (DE); Arno Eifel, Eppelborn (DE)

(73) Assignee: SAP AG, Walldorf (DE)

( * ) Notice: Subject to any disclaimer, the term of this patent is extended or adjusted under 35 U.S.C. 154(b) by 1597 days.

(21) Appl. No.: 11/376,693

(22) Filed: Mar. 14, 2006

(65) Prior Publication Data

US 2007/0219835 A1    Sep. 20, 2007

(51) Int. Cl.
*G06Q 10/00* (2006.01)
(52) U.S. Cl. .................. 705/7.11; 705/7.37; 705/7.41
(58) Field of Classification Search .................. None
See application file for complete search history.

(56) References Cited

U.S. PATENT DOCUMENTS

| | | | |
|---|---|---|---|
| 5,231,567 A * | 7/1993 | Matoba et al. | 700/100 |
| 5,303,144 A | 4/1994 | Kawashima et al. | |
| 5,369,570 A | 11/1994 | Parad | |
| 5,442,561 A * | 8/1995 | Yoshizawa et al. | 700/100 |
| 5,442,730 A * | 8/1995 | Bigus | 706/19 |
| 5,764,543 A | 6/1998 | Kennedy | |
| 5,787,000 A * | 7/1998 | Lilly et al. | 700/95 |
| 5,870,696 A | 2/1999 | Randolph | |
| 5,966,694 A | 10/1999 | Rothschild et al. | |
| 5,970,086 A | 10/1999 | Epstein et al. | |
| 6,233,538 B1 | 5/2001 | Gupta et al. | |
| 6,249,715 B1 | 6/2001 | Yuri et al. | |
| 6,259,959 B1 | 7/2001 | Martin | |
| 6,345,256 B1 | 2/2002 | Milsted et al. | |
| 6,345,259 B1 | 2/2002 | Sandoval | |
| 6,360,188 B1 * | 3/2002 | Freidman et al. | 703/1 |
| 6,434,440 B1 | 8/2002 | Teranishi et al. | |
| 6,496,747 B1 | 12/2002 | Suzuki | |
| 6,546,300 B1 * | 4/2003 | Fukuda et al. | 700/100 |
| 6,564,113 B1 | 5/2003 | Barto et al. | |
| 6,606,527 B2 * | 8/2003 | de Andrade et al. | 700/97 |
| 6,662,066 B1 | 12/2003 | Yu et al. | |
| 6,668,208 B2 | 12/2003 | Baumbusch et al. | |
| 6,738,686 B2 | 5/2004 | Caretta et al. | |
| 6,839,601 B1 | 1/2005 | Yazback et al. | |
| 6,873,878 B2 | 3/2005 | Liu et al. | |
| 6,898,472 B2 | 5/2005 | Crampton et al. | |
| 6,947,951 B1 * | 9/2005 | Gill | 705/7.11 |
| 7,003,477 B2 * | 2/2006 | Zarrow | 705/7.41 |

(Continued)

OTHER PUBLICATIONS

Materials printed from www.wassermann.de website regarding Wassermann Supply Chain Software (5 pages), printed Mar. 10, 2006.

(Continued)

*Primary Examiner* — Thomas Dixon
*Assistant Examiner* — Benjamin S Fields
(74) *Attorney, Agent, or Firm* — Fish & Richardson P.C.

(57) ABSTRACT

An electronic data structure, tangibly embodied in an electronic information carrier, models a manufacturing process, and a computer-implemented method that generates and that uses the data structure. The data structure includes a header structure comprising planned time duration information for a defined manufacturing operation of the manufacturing process. The data structure also includes a resource capacity requirement structure linked to the header structure. The resource capacity requirement structure includes, firstly, planned resource capacity requirement information for a defined resource used in the manufacturing operation, and secondly, planned time refinement information that defines, within the header time duration information, a further refined timeframe during which the defined resource is estimated to be consumed.

20 Claims, 18 Drawing Sheets

U.S. PATENT DOCUMENTS

| | | | |
|---|---|---|---|
| 7,031,893 B2 | 4/2006 | Gupta et al. | |
| 7,054,703 B2 * | 5/2006 | Wu et al. | 700/100 |
| 7,058,587 B1 | 6/2006 | Horne | |
| 7,139,719 B1 | 11/2006 | Cherneff et al. | |
| 7,162,318 B1 | 1/2007 | Brearley et al. | |
| 7,328,078 B2 | 2/2008 | Sanford et al. | |
| 7,363,324 B2 | 4/2008 | Aboulnaga et al. | |
| 7,376,548 B2 | 5/2008 | Sinclair | |
| 7,412,295 B2 | 8/2008 | Rothenburg | |
| 7,489,982 B2 | 2/2009 | Liu et al. | |
| 7,496,860 B2 | 2/2009 | Saxena et al. | |
| 7,617,015 B2 * | 11/2009 | Steinbach et al. | 700/97 |
| 2002/0116084 A1 * | 8/2002 | Falsetti | 700/109 |
| 2002/0161594 A1 * | 10/2002 | Bryan et al. | 705/1 |
| 2002/0173867 A1 | 11/2002 | Duncan et al. | |
| 2003/0014314 A1 | 1/2003 | Griep et al. | |
| 2003/0050817 A1 | 3/2003 | Cargille et al. | |
| 2003/0182180 A1 * | 9/2003 | Zarrow | 705/11 |
| 2003/0225470 A1 * | 12/2003 | Demetriou et al. | 700/100 |
| 2004/0006485 A1 * | 1/2004 | Weed et al. | 705/1 |
| 2004/0019511 A1 * | 1/2004 | McKinney | 705/8 |
| 2004/0193502 A1 | 9/2004 | Heitner et al. | |
| 2006/0106473 A1 | 5/2006 | Enright et al. | |
| 2006/0155412 A1 | 7/2006 | Ikeda | |
| 2007/0162491 A1 | 7/2007 | Schmitz et al. | |
| 2007/0219835 A1 * | 9/2007 | Steinbach et al. | 705/7 |
| 2008/0103715 A1 | 5/2008 | Tsuda et al. | |
| 2008/0140356 A1 | 6/2008 | Sanford et al. | |
| 2008/0154660 A1 * | 6/2008 | Steinbach et al. | 705/7 |
| 2009/0039024 A1 | 2/2009 | Jenkins et al. | |

OTHER PUBLICATIONS

Shaw C. Feng, Manufacturing Planning and Execution Software Interfaces, 2000, Journal of Manufacturing System, vol. 19/No. 1, p. 1-17.

Almeida et al. "A Workload Data Aggregation Process for Flexible Manufacturing System Modeling Queuing Network Models" 2001 International Journal of Flexible Manufacturing Systems, pp. 309-350.

* cited by examiner

FIG. 9

ROUGH-CUT MANUFACTURING OPERATIONS FOR USE IN PLANNING

TECHNICAL FIELD

This document relates to manufacturing planning and execution computing systems.

BACKGROUND

A manufacturing planning and execution computing system may be used in a manufacturing environment that produces products according to a demand for those products. Such a system is able to control and track the operation of the manufacturing process, and uses predefined manufacturing process master data that typically is made up of many defined execution operations. Each of the separate execution operation definitions may include, for example, what the inputs to the operation are, what machinery (or resource) must, or may, be used in the operation, and what the output of the operation is. This predefined master data also typically defines a process flow, or linkage, between each of the individual manufacturing operations. During execution of the system, the system controls and tracks each of the operations in the overall process.

The system may, for example, provide control such as making a selection of one of several similarly functioning machines to be used to perform a particular manufacturing operation. In addition, the system may provide for tracking of the process through the use of confirmations, by user entry or automatically by a machine for example, that a particular manufacturing operation has commenced or has been completed, for example.

A maximum or optimum that a manufacturing operation is able to produce given the available resources may be referred to as the overall capacity for the manufacturing operations. Individual production orders generated from customer demand information may be said to require all or a portion of the overall capacity, and thus may be said to have a capacity requirement. In addition to the overall capacity for the manufacturing operations, individual resources such as human capital and machine tools may each have a maximum or optimum capacity, and a production order may impose a capacity requirement on each of the resources. In addition, a specific resource capacity requirement may be organized in a manufacturing computing system under a defined manufacturing operation during which the resource is used. The manufacturing operations also require the use of materials (e.g., input materials) to create the finished output. As with capacity, a production order may impose various material requirements. A specific material requirement may also be organized in a manufacturing computing system under a defined manufacturing operation during which the material is used.

In an example manufacturing computing system, the system may include a planning tool that plans how a defined demand will be produced. The master data that defines the execution operations of the manufacturing process may be used in the planning process to determine the time it will take to meet the defined demand and the materials and resources needed. In many manufacturing processes, the number of execution operations is very large, and the interrelationships between different execution operations is sometimes very complicated. This makes the planning process a challenge, in that the level of granularity of information provided to a planning user may be too great for the planning user to be able to appreciate higher-level issues to consider in a planning process.

SUMMARY

In one aspect, there is provided a computer-implemented method for generating electronic data for use in planning execution of a manufacturing process. The method includes receiving a user-defined grouping of multiple execution-level manufacturing entities that are defined in a manufacturing process execution-level electronic data model that is designed for use with a computer-implemented method used in executing the manufacturing process to produce product. The method also includes performing an aggregation of resource-related information associated with multiple execution-defined resources that are within the scope of the user-defined grouping, the aggregation being performed for a purpose related to planning execution of the manufacturing process to produce product.

In various implementations the method may include one or more of the following features. The user-defined grouping of multiple execution-level manufacturing entities may be a grouping of multiple execution-level manufacturing operations that are defined in the manufacturing process execution-level electronic data model. In this case, the aggregation of resource-related information may be an aggregation of resource capacity requirements associated with one or more execution-level manufacturing resources that are within the scope of a defined planning-level resource and that are consumable during execution of the grouped execution-level manufacturing operations. The aggregation may be performed as part of generating planning-level master data that is used in a computer-implemented process for planning the execution of the manufacturing process, and additionally or alternatively as part of generating a planning-level production order from an execution-level production order.

Additionally, the user-defined grouping of multiple execution-level manufacturing entities may be a grouping of multiple execution-level manufacturing resources that are defined in the manufacturing process execution-level electronic data model. In this case, the aggregation of resource-related information may be an aggregation of resource capacity supply associated with execution-level manufacturing resources that are within the scope of the user-defined grouping. Again, the aggregation may be performed as part of generating planning-level master data that is used in a computer-implemented process for planning the execution of the manufacturing process.

Also, the user-defined grouping of multiple execution-level manufacturing entities may include both a grouping of multiple execution-level manufacturing operations that are defined in the manufacturing process execution-level electronic data model, and a grouping of multiple execution-level manufacturing resources that are defined in the manufacturing process execution-level electronic data model.

The method may also include performing a filtering function for a purpose related to planning execution of the manufacturing process to produce product. The filtering function may include filtering an execution-level manufacturing resource that is defined in the manufacturing process execution-level electronic data model so that the filtered resource is not given consideration during a computer-implemented process for planning the execution of the manufacturing process. Additionally or alternatively, the filtering function comprises filtering an execution-level material input that is defined in the manufacturing process execution-level electronic data model so that the filtered material input is not given consideration during a computer-implemented process for planning the execution of the manufacturing process.

In another aspect, there is provided a computer-implemented method for generating electronic data for use in planning execution of a manufacturing process that includes, firstly, receiving a user-defined grouping of multiple execution-level manufacturing operations that are defined in a manufacturing process execution-level electronic data model that is designed for use with a computer-implemented method used in executing the manufacturing process to produce product. The method also includes performing an aggregation of time duration information associated with each of the grouped execution-level manufacturing operations, the aggregation being performed for a purpose related to planning execution of the manufacturing process to produce product.

In various implementations this method may include one or more of the following features. As with the other aggregation methods the time duration information aggregation may performed as part of generating planning-level master data that is used in a computer-implemented process for planning the execution of the manufacturing process. Additionally or alternatively, the aggregation is performed as part of generating a planning-level production order from an execution-level production order. In yet another aspect, there is provided computer program products tangibly embodied in an information carrier and comprising instructions that when executed by a process perform the above described and methods described in the following detailed description. In addition, there are systems provided that operate to perform the above and following described methods.

In another aspect, this document describes an electronic data structure, tangibly embodied in an electronic information carrier, that models a manufacturing process, and describes a method of generating and using the data structure. The data structure includes a header structure comprising planned time duration information for a defined manufacturing operation of the manufacturing process. The data structure also includes a resource capacity requirement structure linked to the header structure and comprising, firstly, planned resource capacity requirement information for a defined resource used in the manufacturing operation, and secondly, planned time refinement information that defines, within the header time duration information, a further refined timeframe during which the defined resource is estimated to be consumed.

In various implementations the data structure may include one or more of the following features. The planned time refinement information may include a defined offset for the refined timeframe from one of a starting point in time of the manufacturing operation and an ending point in time of the manufacturing operation. Alternatively, the planned time refinement information may include a first defined offset for the refined timeframe from a starting point in time of the manufacturing operation and a second defined offset for the refined timeframe from an ending point in time of the manufacturing operation.

Also, the data structure may be used in planning the execution of the manufacturing process, the defined manufacturing operation may be a planning-level operation that comprises an aggregation of a defined group of execution-level manufacturing operations, and the planned resource capacity requirement information may be for a defined planning-level resource, wherein the planned resource capacity requirement information is determined from resource capacity requirement information associated with execution-level resources included in the defined planning level resource and that are associated with the defined group of execution-level manufacturing operations included in the defined planning-level operation. In this case, the planned time refinement information may be determined from an electronic data model that defines a routing of the execution-level operations grouped into the defined planning-level operation. The data structure may include multiple ones of the resource capacity requirement structure for multiple different defined resources that are consumed during the defined manufacturing operation. The defined execution-level operations may be defined in a data model for the manufacturing process that is used by a computer-implemented method used in executing the manufacturing process to produce product In further variations, the data structure may include multiple ones of the header structure, wherein each of the header structures has one or more linked ones of the resource capacity requirement structure. In this case, the data structure may also include an inter-operation timing relationship structure that includes planned information for a timing relationship between two different defined manufacturing operations. The planned timing relationship information may include time relationship information between an ending point in time for a first one of the defined manufacturing operations to a starting point in time for a second one of the defined manufacturing operations. The timing relationship information may include a first component comprising planned time duration information between the ending point in time for the first manufacturing operation and the starting point in time for the second manufacturing operation, and a second component comprising planned information that defines whether the starting point in time for the second manufacturing operation begins either before or after the ending point in time for the first manufacturing operation.

Also, the data structure may also include a material requirement structure linked to the header structure and including, firstly, planned material requirement information for a defined material input in the manufacturing operation, and secondly, planned time relationship information that defines, within the header time duration information, a further refined timeframe at which the defined material is estimated to be input. In addition, the planned time duration information may include information from which a time duration measure is calculable for the defined manufacturing operation for a specified manufacturing order having a specified quantity of product. In addition, the planned resource capacity requirement information may include information from which a capacity requirement time measure is calculable for the defined resource for a specified manufacturing order having a specified quantity of product.

In another aspect, this document describes an electronic data structure, tangibly embodied in an electronic information carrier, that models data to be used in planning the execution of a manufacturing process, and a method that generates and that uses the data structure. The data structure comprises a header structure and a linked resource capacity requirement structure. The header structure includes planned time duration information for a defined planning-level manufacturing operation that is made up of an aggregation of a defined group of defined execution-level manufacturing operations. The planned time duration information is determined from time duration information associated with each of the grouped execution-level manufacturing operations. The resource capacity requirement structure linked to the header structure includes planned resource capacity requirement information for a defined planning-level resource. The planned resource capacity requirement information is determined from resource capacity requirement information associated with execution-level resources included in the defined planning-level resource and that are associated with the grouped execution-level operations included in the defined planning-level operation. The capacity requirement structure further includes planned time refinement information that defines, within the header time duration information, a further refined timeframe during which the defined planning-level resource is estimated to be consumed.

In various implementations the data structure may include one or more of the following features. The planned time refinement information may include a defined offset for the refined timeframe from one of a starting point in time of the planning-level operation and an ending point in time of the planning-level operation. Alternatively, the planned time refinement information may include a first defined offset for the refined timeframe from a starting point in time of the planning-level operation and a second defined offset for the refined timeframe from an ending point in time of the planning-level operation. The planned time refinement information may be determined from an electronic data model that defines a routing of the execution-level operations grouped into the defined planning-level operation.

In addition, the data structure may include multiple ones of the resource capacity requirement structure for multiple different defined planning-level resources that are consumed during the defined planning-level operation. The data structure may further include multiple ones of the header structure, wherein each of the header structures has one or more linked ones of the resource capacity requirement structure. In this case, the data structure may also include an inter-operation timing relationship structure that comprises planned information for a timing relationship between two different defined planning-level operations. The planned timing relationship information may include time relationship information between an ending point in time for a first one of the defined planning-level operations to a starting point in time for a second one of the defined planning-level operations. The timing relationship information may include a first component comprising planned time duration information between the ending point in time for the first planning-level operation and the starting point in time for the second planning-level operation, and a second component comprising planned information that defines whether the starting point in time for the second planning-level operation begins either before or after the ending point in time for the first planning-level operation.

Also, the defined execution-level operations may be defined in a data model for the manufacturing process that is used by a computer-implemented method used in executing the manufacturing process to produce product. The planned time duration information may include information from which a time duration measure is calculable for the defined planning-level operation for a specified manufacturing order having a specified quantity of product. The planned resource capacity requirement information may include information from which a capacity requirement time measure is calculable for the defined planning-level resource for a specified manufacturing order having a specified quantity of product.

In another aspect, there is provided computer program products that include executable program instructions that when executed by a processor execute the instructions to perform the computer-implemented methods that generate and use the data structures.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 9 is a graph of an exemplary Gantt chart to provide visual presentation of the production process schedule on planning boards.

Like reference symbols in the various drawings indicate like elements.

DETAILED DESCRIPTION

FIG. 1 shows an exemplary manufacturing or production entity 100 that includes a manufacturing planning and execution computing system 102 and a manufacturing environment 104, which may be, for example, a manufacturing shop floor. The manufacturing entity 100 may be any type of facility or manufacturing plant—or multiple facilities or plants under control of a distributed computing system—that manufactures any type of product and supplies product to customers.

Figure 1A:
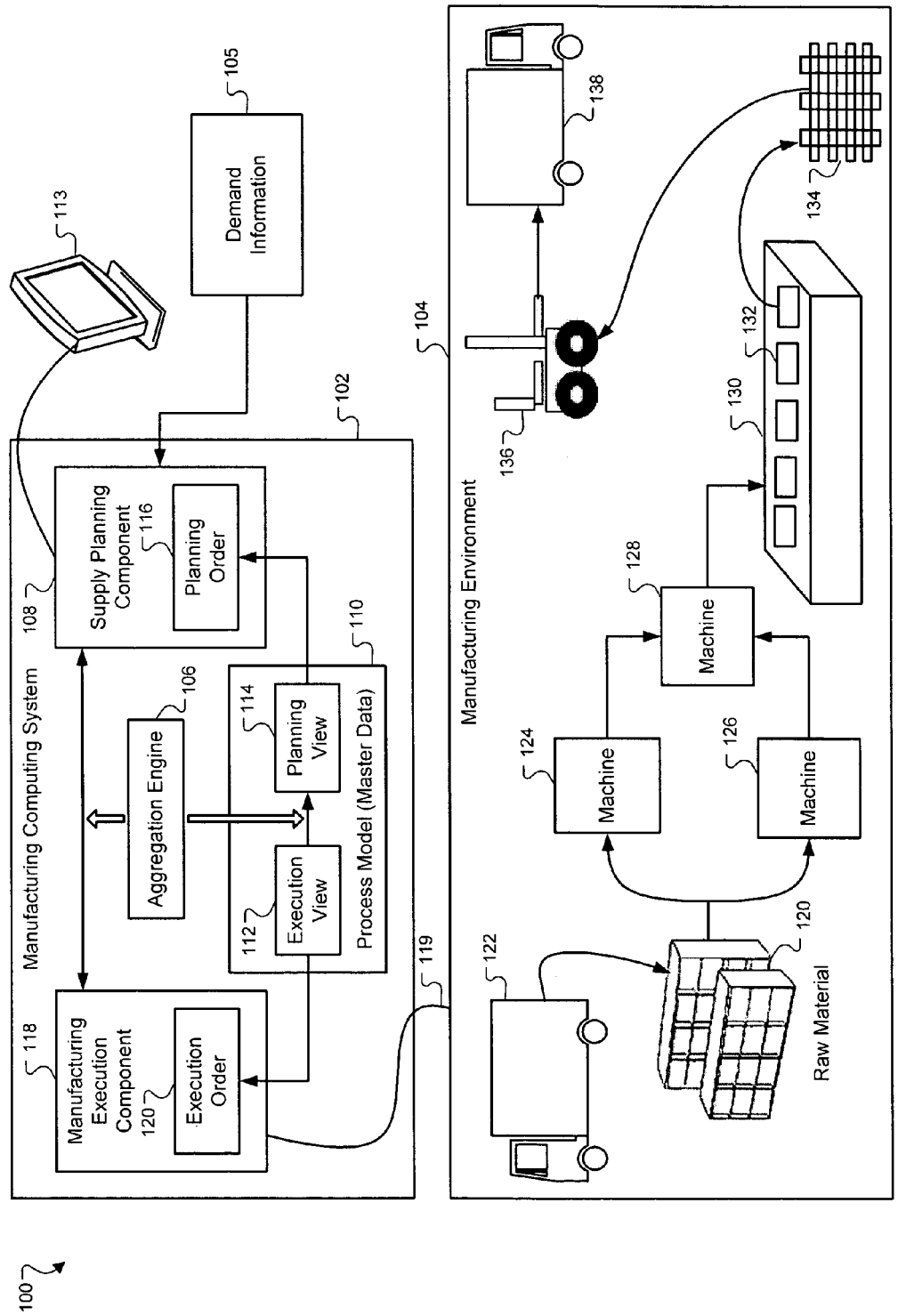
FIG. 1A is a block diagram of an exemplary manufacturing entity in which a manufacturing planning and execution computing system is used.

The manufacturing planning and execution computing system 102 has a supply planning component 108 and a manufacturing execution component 118. The supply planning component 108, which also may be referred to as a manufacturing planning component, is a tool that a user may employ to plan how the manufacturing environment 104 can be operated to achieve a supply of end products that meets a specified demand. The planning component 108 receives, as shown in FIG. 1A, demand information 105, which may, for example, be in the form of a customer order that the manufacturing entity 100 supply a specified number of product within a specified timeframe, or the demand information may be internally generated by the supplier or manufacturer based on a forecast. The planning component 108 produces planning production orders 116, which may be used in the generation of a separate execution order 120, which is used by the execution component 118 in executing the manufacturing process to meet the demand input. A user station 113 is shown in FIG. 1A to illustrate that a planning user may interact with the manufacturing computing system 102 to perform supply planning functions, described in more detail later.

The manufacturing execution component 118 is the "execution" portion of the manufacturing planning and execution system 102. The execution component 118 operates to control and track the execution of the manufacturing process carried out by the manufacturing environment 104 in accordance with execution orders 120. As such, FIG. 1A shows that there is an interface 119 between the manufacturing execution module 118 and the manufacturing environment 104, which interface 119 serves to integrate the computing system 102 with the manufacturing environment 104, or shop floor. For example, the interface 119 allows the computing system 102 to provide instructions that control when and where materials and resources will be used in the manufacturing environment 104, as well as the ability of the computing system 102 to receive input from the manufacturing environment 104, for example, confirming that a certain manufacturing operation has been completed.

The manufacturing planning and execution computing system 102 includes predefined manufacturing process master data, including routing definitions, shown in FIG. 1A as stored in repository 110. In particular, there are two levels of defined master data stored in repository, execution-level (or "execution view") master data 112 and planning-level (or "planning view" master data 114). The execution-level manufacturing process master data are, in a typical case, defined by a process designer or engineer. The execution-level master data typically define each of the operations of the manufacturing process in detail, and how each of the operations relates to other operations. The execution-level manufacturing master data are generally defined up front, before the manufacturing process is ever run, and are generally not changed very frequently. In some cases, however, the master data may be changed more frequently, and even daily.

The planning-level master data 114 is generated from the execution-level master data 112, using grouping and aggregation methods that will be described in more detail later. An aggregation engine 106 included in the manufacturing computing system 102 includes aggregation rules for generating the planning-level master data 114 from the execution-level master data 112. The supply planning module 108 uses the planning-level, or "planning view," manufacturing process master data stored in repository 110 in the planning operations that the supply planning component 108 performs. The planning-level master data may also be referred to as a planning process model, or a "rough-cut model."

Generally, many manufacturing operations for execution are defined in the execution-level master data to make up the overall manufacturing process. The planning component 108, instead of using the execution view master data that includes all of the defined execution operations, uses the planning-level master data during the planning process. For example, a manufacturing process of twenty defined execution operations may be grouped into three planning, or "rough-cut," operations of, for example, six execution operations for a first planning operation, eight execution operations for a second planning operation, and six execution operations for a third and final planning operation. By using grouping and aggregation functionality to create separate planning-level master data to use in the planning process, constraints arising from any of the execution operations may be accounted for in the planning process (or ignored if the details are not needed), but the level of granularity will be appropriate.

In addition, the manufacturing computing system 102 may also allow a user to select the level of granularity desired in the planning process by selecting which of the execution operations will be grouped into a planning, or rough-cut, operation. The user may do this by putting "markers" in the overall process flow of execution operations, and the markers, in addition to the beginning and end points of the overall process flow, will serve as end-points of the execution operations that are grouped into a single planning, or rough-cut, operation. For example, for a routing that has 20 execution operations, setting a marker between execution operations six and seven and another marker between execution operations fourteen and fifteen will yield three planning operations of, respectively, six, eight, and six execution operations. In one implementation, a user may set the markers, and hence define the groupings of execution operations, once, and then the planning master data 114 will be created based on these groupings and stored in the master data repository 110. Then, the planning master data 114 created using those groupings will be used in the planning process for a particular demand input 105, and will have a level of granularity defined by the groupings. If more granularity is desired, the markers may be redefined to have more planning operations, and new planning master data may be created with the newly defined groupings. In addition, several different groupings may be defined and master data generated for use in planning, and in addition, it may be possible in some implementations to change the grouping definitions during the planning process.

In addition, a user may select to filter selected materials and resources out of the planning process. This may be done, for example, for materials and resources that are known to not be "critical path" components and need not be considered during planning. This may also be done to reduce the number of things a planner is to consider during a planning process. In a further example, a user may select the accuracy for the capacity planning so that the constraints for resource capacity supply and capacity requirements in planning may be relaxed based on the selection. This will be described in more detail later in the context of performing rough-cut planning.

The planning component 116 may use a predefined "rough-cut" planning data structure that is part of the planning master data 114. This rough-cut data structure defines the structure of each planning, or rough-cut, operation and defines the relationship of resource capacity requirements to the planning operation. The rough-cut data structure will be described in more detail later.

As mentioned previously, the supply planning component 108 prepares an planning-level electronic production order 116. At an appropriate point in time, the planning-level production order may be released for execution, at which time an execution-level production order 120 may be generated using the execution-level master data 112 and information defined in the planning-level production order 116. The aggregation engine 106 is also involved in this process, as is described later. The execution order 120 will be used by the manufacturing execution component 118. The planning order 116, as will be explained in more detail later, will typically include a calculated time duration measure required for each of the defined planning operations, or rough-cut operations. In addition, the planning order 116 may also include a rough planned schedule for the rough-cut operations, a list of selected and non-filtered, manufacturing material requirements and resource capacity requirements, and scheduled times of when the material and resource capacity requirements will be needed. The planning order 116 is prepared at a level of granularity corresponding to the level of granularity of the planning-level master data 114 used in the planning process. Later, when the planning order 116 is released for execution, the aggregation engine 106 is used, this time in the inverse, to generate an execution order from the execution master data 112 that is consistent with scheduling included in the planning order 116.

The production environment 104 shown in FIG. 1A is a simplified example of a complete manufacturing process to produce a product from beginning to end. The process in this example includes both production (making) and logistics (moving) functions. The process begins with the delivery of raw material from a truck 122. The raw material is shown being stored in a storage area 120. From there, the raw material may be processed by one of two alternative machines 124 and 126. The output of both machines 124 and 126 feeds into another machine 128. The output of machine 128 feeds into a transport process, such as a conveyor system 130, that delivers the output products 132 of machine 128 to an output staging area where the output product 132 is loaded onto pallets 134. There may also be a packing operation to package the output products 132 before they are loaded onto pallets. A forklift 136 is then used to load pallets of finished and packaged product into a truck 138 for final delivery. It will be appreciated that the FIG. 1A example is a simplified high-level depiction of a manufacturing environment 104 for illustration purposes only, and that an actual environment may be much more complex and involve many more execution operations.

The execution component 118 performs execution and control functions on the manufacturing environment 104 according to the generated execution order 120. For example, the execution component 118 may instruct the manufacturing environment 104 to execute the operations or the sub-activities. Upon receiving the instructions, the manufacturing environment 104 may execute the received instructions and report status of the production floor 104 to the execution component 118.

The computing system 102 may generate various different user interface views to assist both the planning component 108 and the execution component 118. The system 102 may generate a planning board and various execution information screens, for example. The planning board may provide a visual display of the process flow using planning operations, as defined by markers selected by a user, as separate blocks of the overall process flow. The planning board may be used during a planning function, and the execution screens may be used in an execution function.

Figure 1B:
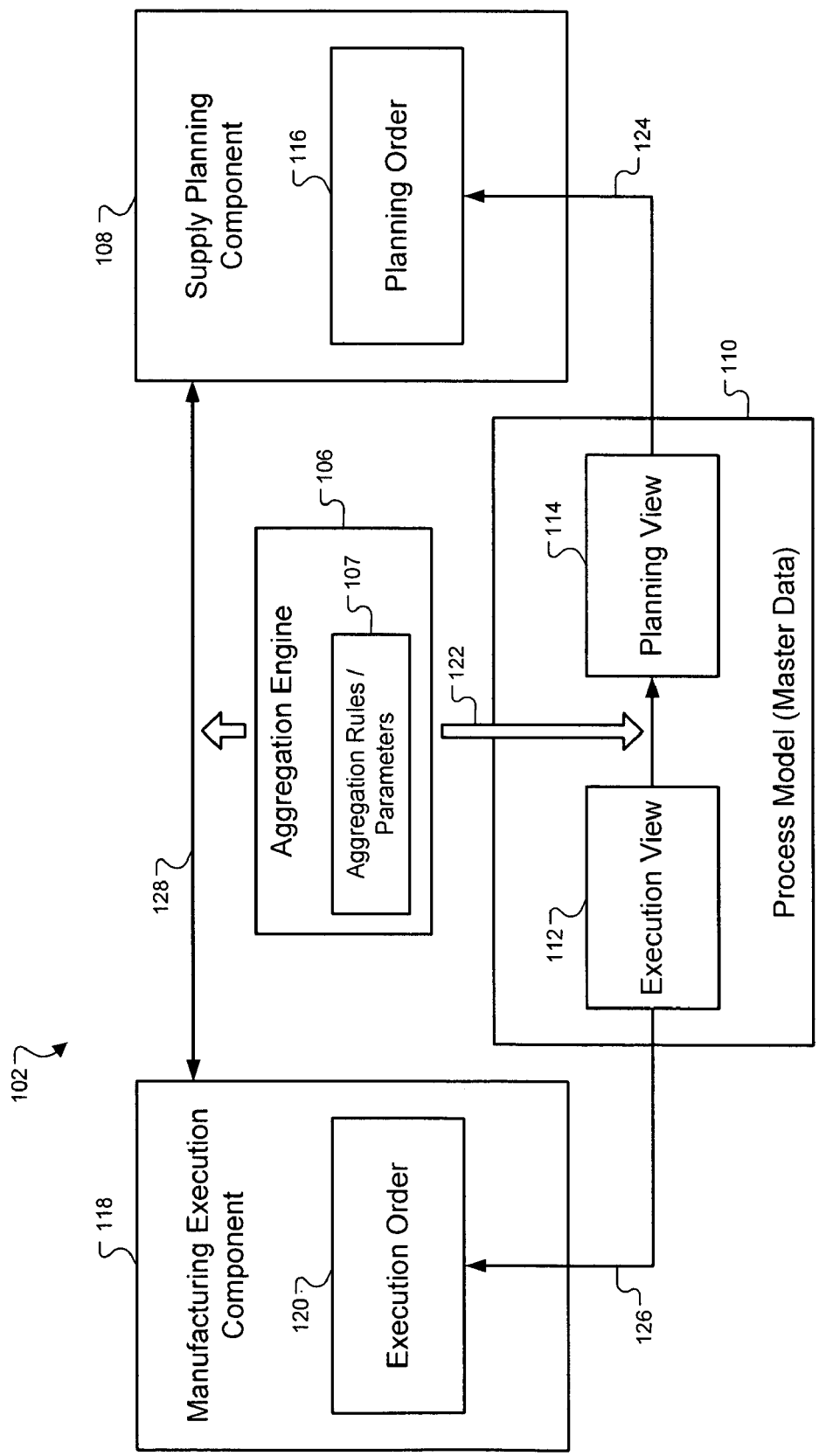
FIGS. 1B-1D are block diagrams of three different perspectives of an example of the manufacturing planning computing module shown in FIG. 1A, shown in more detail.

FIG. 1B shows a more detailed view of an example manufacturing computing system 102 shown in FIG. 1A. Many of the components shown in FIG. 1B have already been described in connection with FIG. 1A. The following discussion of FIG. 1B will address the general operation of the system 102 in the context of planning functions. First, as shown in FIG. 1B, the aggregation engine 106 includes aggregation rules and parameters 107. The aggregation rules and parameters 107 may be predefined rules that enable a translation between execution-level information and planning-level information, and vice-versa. Generally, the rules and parameters 107 may define how several execution operations may be aggregated into a single planning operation, and may define relationships, including timing relationships, between various defined planning operations. In addition, the aggregation rules and parameters 107 may be used in an inverse manner in the generation of an execution order 120 from a planning order 116. The rules may include pre-configured rules for how aggregations are performed given user-supplied parameters, which will be described in more detail later.

As shown by arrow 122, the aggregation engine 106 is used in the generation of the planning-level master data 114 from the execution-level master data 112. Then, as shown by arrow 124, the planning-level master data 114 is used to produce the planning order 116. The execution-level master data 112 and the planning order 116 are both used to generate the execution order 120, as shown by arrows 126 and 128. In one implementation, the execution order 120 is generated initially based on the execution-level master data 112, and then the planning order 116 is used for the scheduling information it contains. The aggregation engine 106 is used in this process to ensure that the detailed scheduling that occurs as part of generating the execution order 120 is consistent with the planning order 116 and its defined level of granularity and how the groupings are defined.

Although it is contemplated that in the typical scenario the execution order 120 is generated from the planning order 116, it is also possible that the planning order 116 may be generated from the execution order 120. As such, arrow 128 between the manufacturing execution component 118 and the supply planning component 108 is shown as a two-way arrow. In addition, in some cases the execution order 120 may get revised during execution, for example, because the manufacturing process may be ahead of or behind schedule. In such a case, the planning order 116 may be updated so that additional planning processes that take into account the information set forth in the planning order 116 may take the changed circumstances into account. Here again, when the planning order 116 is updated by a revised execution order 120, the aggregation engine 106 may be involved in the process to make the necessary translations.

In the implementation shown in FIG. 1B, the execution view master data 112 includes execution-level resources 112a; an execution-level routing 112b that defines the execution-level operations, inter-relationships between the operations, and where resources and materials are used in the operations (and which resources and materials are used in the operations); and an execution-level bill of material 112c that defines constituent materials that make up an end product produced by the manufacturing process. Similarly, the planning view master data 114 includes planning-level resources 114a; a planning-level routing 114b that defines the planning-level operations, inter-relationships between the operations, and where resources and materials are used in the operations (and which resources and materials are used in the operations); and a planning-level bill of material 114c that defines constituent materials that make up an end product produced by the manufacturing process. As will be described in more detail later, a number of execution-level resources may be grouped to define a planning-level resource, a number of execution-level operations may be grouped to define a planning-level operation, execution-level resources and BOM materials may be filtered so that they are not included in the planning-level resources or the planning-level BOM, respectively.

Figure 1C:
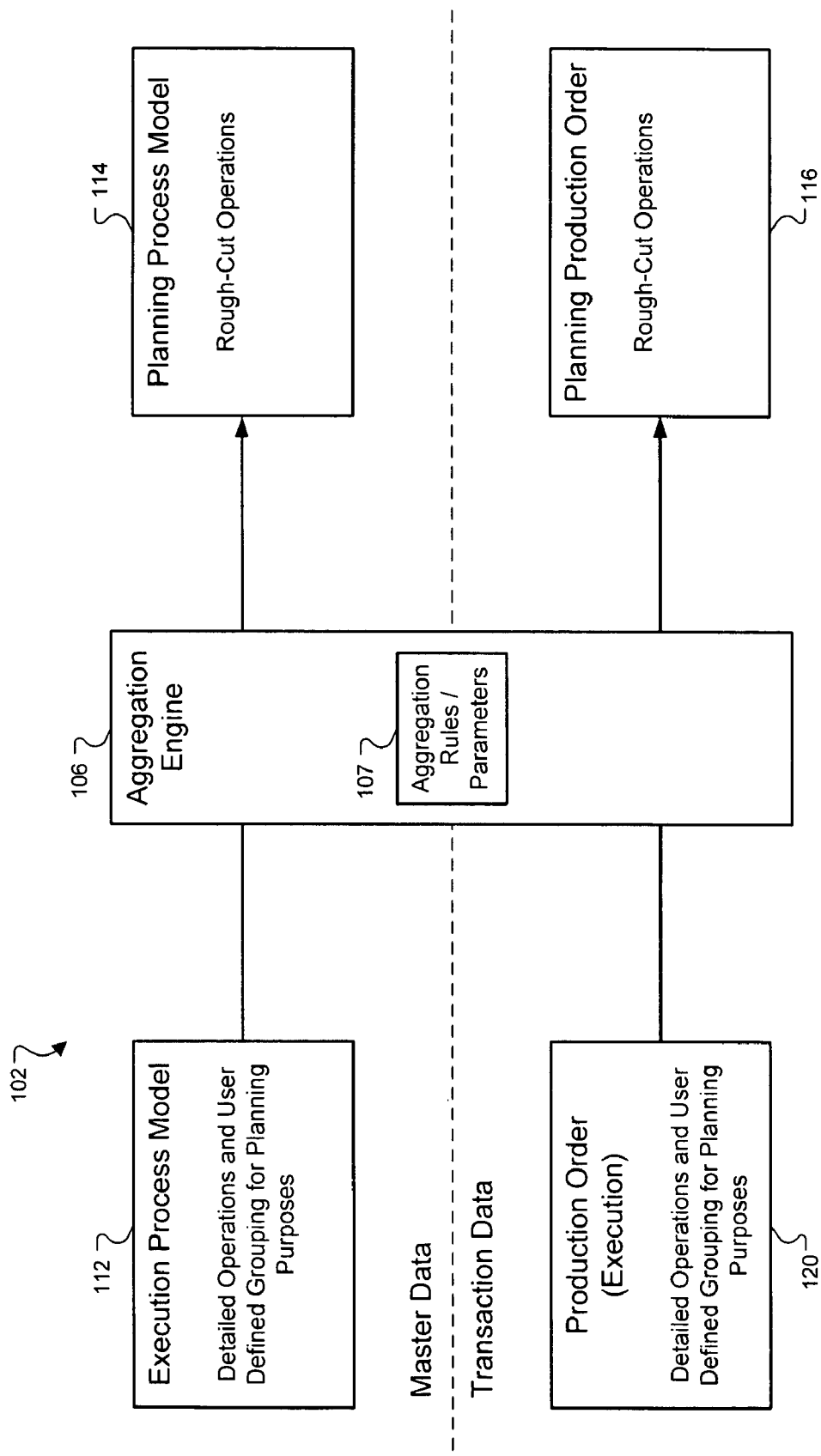

Referring now to FIG. 1C, another depiction of the system 102 shown in FIGS. 1A and 1B is shown to illustrate another point. In particular, FIG. 1C illustrates that the aggregation engine 106 is used both in generating planning-level master data 114 from execution-level master data 112 (that is, a master data layer), and in generating planning production orders 116 (that is, at a transactional data layer), for example from execution production orders 120 if an execution production order 120 has already been generated. A main use for the translation from an execution order to a planning order is updating a planning order with execution order information, as described earlier.

As shown in FIG. 1C, the execution-level master data 112 may also be referred to as an execution process model, and includes definitions for the detailed execution-level operations. In addition, the execution-level master data 112 may also include user-defined groupings, for example of one or more execution-level operations or of execution-level resources. The planning process model 114 includes definitions for planning operations, which may also be referred to as rough-cut operations. This may be the data structure for the rough-cut operation described previously. In addition, the execution-level production order 120 may similarly include information about the detailed operations, but in this case, it will be information about the operations for a specific order. Again, the execution-level production order 120 may include user-defined groupings for planning purposes, which may not the case is all scenarios. The planning production order 116 also includes information about rough-cut operations, although in this case it will be the rough-cut operations for a particular order.

Figure 1D:
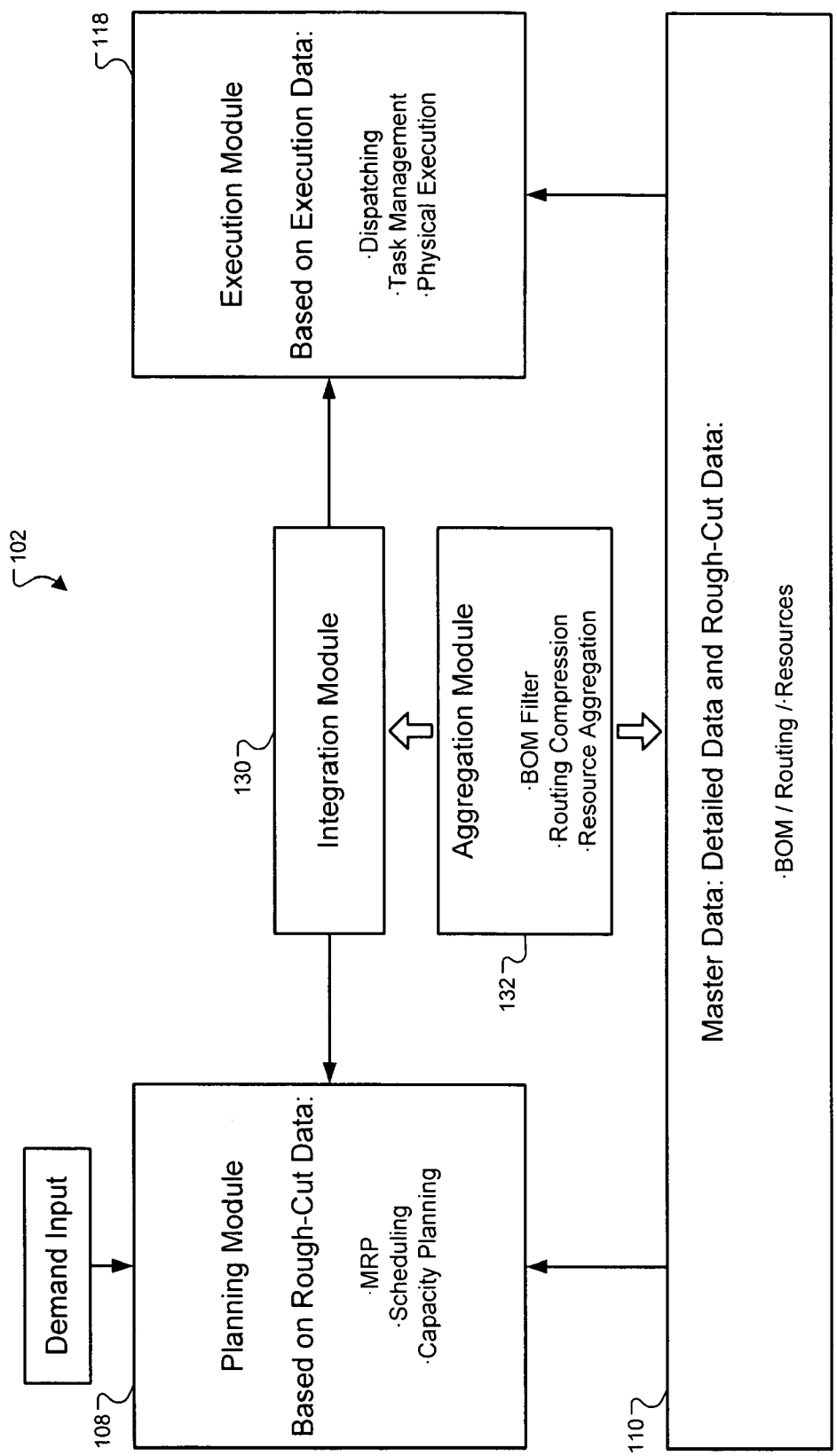

FIG. 1D shown another perspective of the system 102 shown in FIGS. 1A-D. Here it is shown that the planning component, or module, 108 includes various planning functionality to perform manufacturing resource planning (MRP), scheduling, and capacity planning, for example. These functions will be described in more detail later. In addition, the functions are performed using rough-cut data as generated using the rough-cut process model, or planning master data, stored in master data repository 110. FIG. 1D also shows that the execution component, or module, 118 includes various execution functionality, including for example dispatching functions (for example, to dispatch materials or resources to be used in the manufacturing process), task management, and physical execution. These functions are performed using detailed, or execution-level, data.

FIG. 1D shows that the system 102 has an integration module 130, which integrates the execution module 118 and the planning module 108. As shown, an aggregation module 132 works in concert with the integration module 130. As will be described in more detail later, the aggregation module 132 includes a bill of material filter to filter material requirements that are not planning relevant, routing compression functionality to aggregate grouped execution-level operations into a few number of planning-level operations (and vice-versa), and resource aggregation functionality to aggregate two or more execution-level resources into one virtual planning-level resource (and vice-versa).

Figure 2:
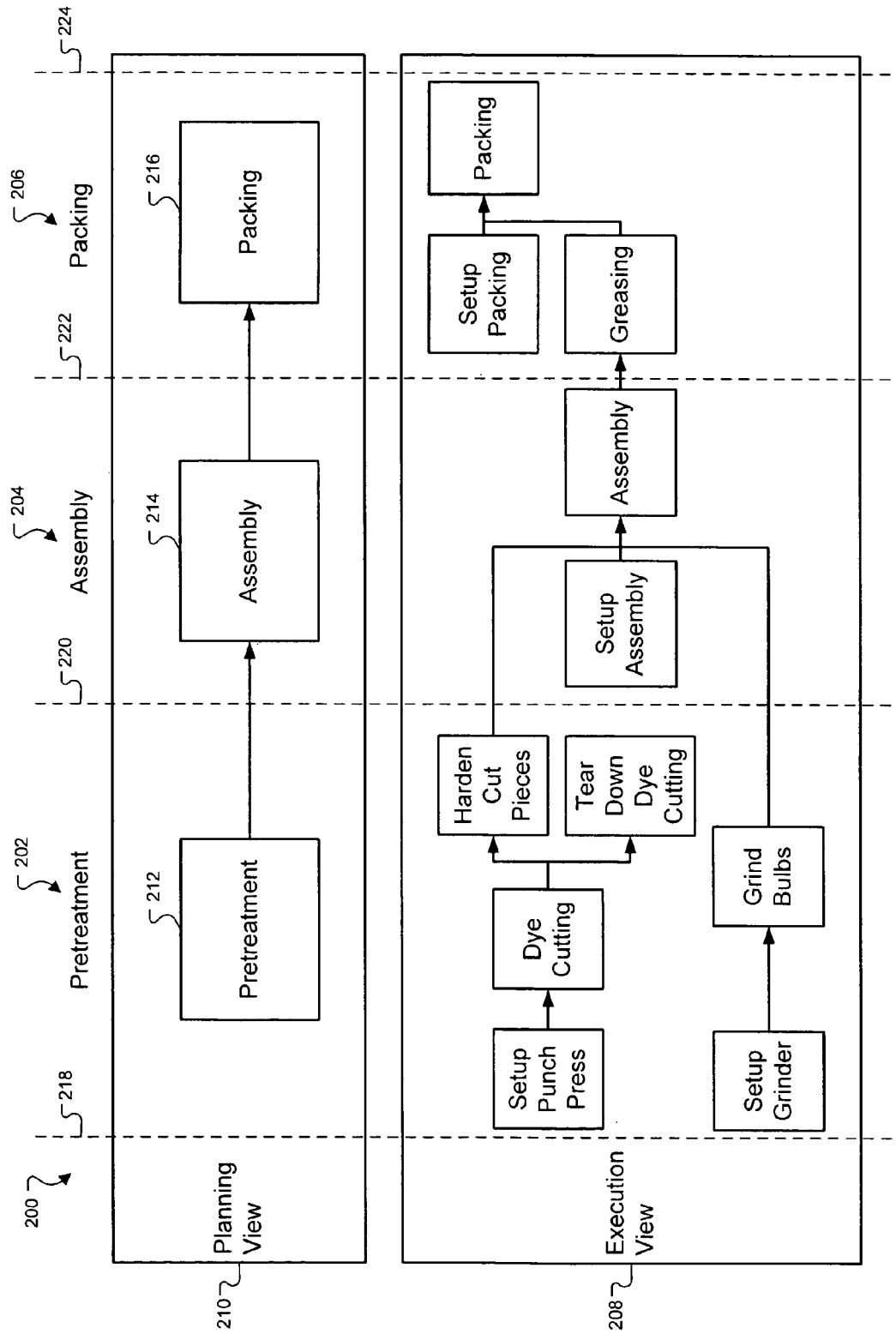
FIG. 2 is a diagram that illustrates execution view and planning view versions of a manufacturing process master data.

FIG. 2 is a diagram that illustrates the different levels of granularity in an execution view 208 (that is, execution-level master data 112, as shown in FIG. 1A) versus a planning view 210 (that is, planning-level master data 114). In the planning view 208, the production floor operations may be represented as three production stages, a pretreatment stage 202, an assembly stage 204, and a packing stage 206. As such, the supply planning module 108 may generate a planning production order 116 (see FIG. 1A) that includes scheduling and time duration information for the three planning-level operations 212, 214 and 216. Each of the three planning operations 202, 204 and 206 is made up of a defined group of execution-level operations. For example, the pretreatment planning operation 212 is an aggregation of six execution-level operations, namely, setup punch press, dye cutting, harden cut pieces, tear down dye cutting, setup grinder and grind bulbs. The assembly planning-level operation 214 is an aggregation of two execution-level operations, namely, setup assembly and assembly. The packing planning-level operation 216 is an aggregation of three execution-level operations, namely, setup packing, greasing, and packing.

Not all of the information included in the execution view 208 may be relevant to planning. For example, a planning user may only be interested in scheduling a high level of granularity of the three main planning-level operations including pretreatment 202, assembly 204 and packing 206. The planning user may be not be interested in scheduling at a detailed level of activities such as setup activities, tear down activities, or the like. Accordingly, the planning user may define the rough-cut operations shown in the planning view 210 by placing user-selected markers in the execution routing. In this example, the user has defined three planning operations of interest, a pretreatment operation 212, an assembly operation 214, and a packing operation 216. The planning user may then define the planning operations 202, 204, 206 by placing user-selected markers to group execution operations in the execution view 208. FIG. 2 also shows planning operation borders 218, 220, 222, 224. Users may place marks in the execution routing at the position of the borders 220 and 222 to define the planning operations 212, 214, 216. For example, the pretreatment operation 212 is defined by the border 218 and the border 220 and may have characteristics approximated using the characteristics of the activities and operations include between the borders 218 and 220 in the execution view 208. The detail of the placement of the user-selected points will be discussed below.

Figure 3:
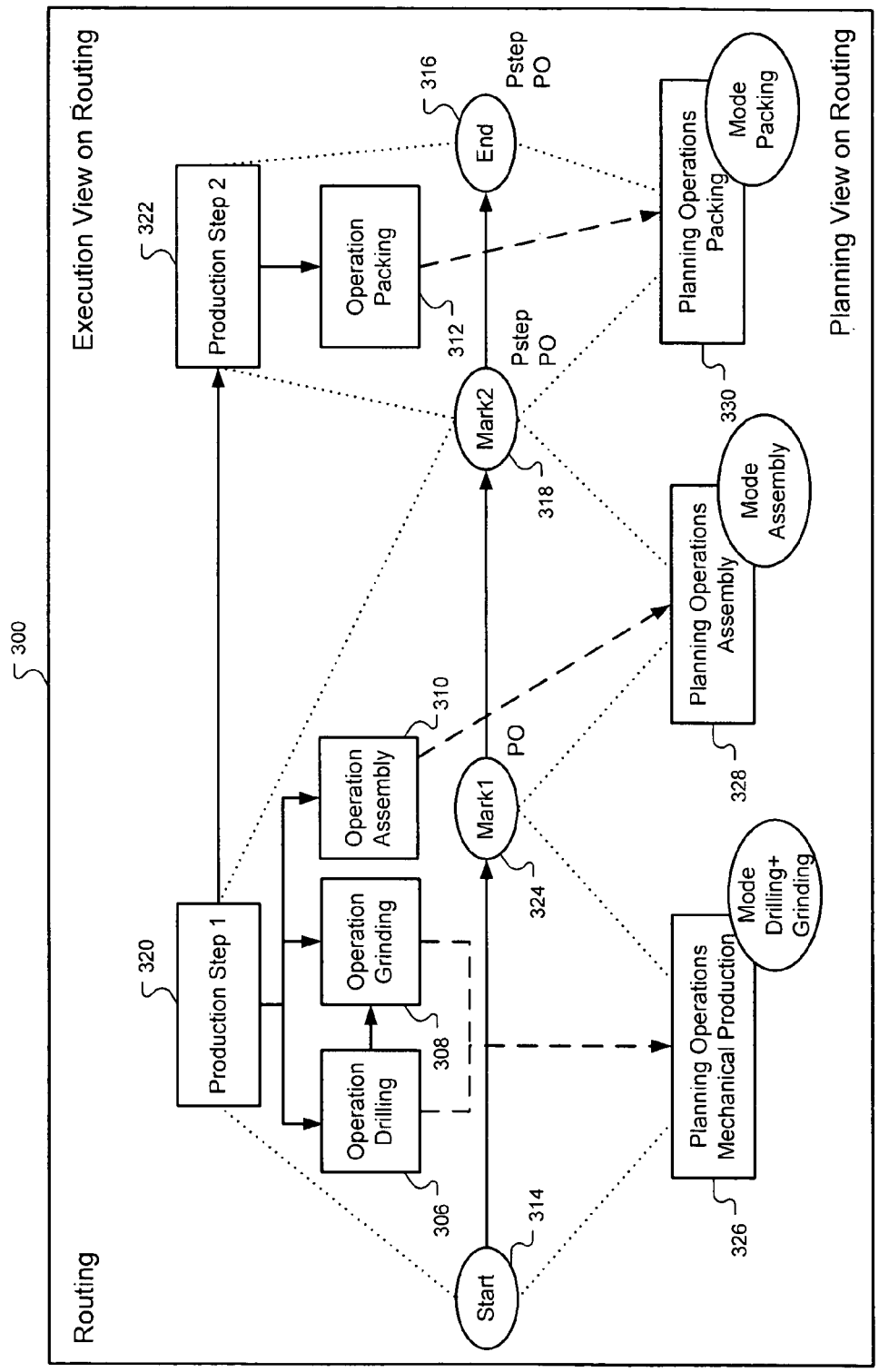
FIG. 3 is a block diagram of an exemplary routing that includes production steps and planning operations that may be defined by a set of markers.

Referring to FIG. 3, there is another conceptual depiction of a routing 300 that illustrates the difference between the detailed execution-level operations of the execution view of the routing, and the less granular planning-level operations of the planning view of the routing. In addition, FIG. 3 shows the use of markers, and specifically two different types of markers, that define different groupings. One set of markers are "planning activity" (PA) markers, and these define the groupings for the planning-level, or rough-cut operations used for planning purposes. The other set of markers are "production step" (PStep) markers, and these define groupings that are used in functions that are unrelated to planning, such as in execution to define the points in time where confirmations are made as to when a confirmation if completion is made at an intermediate point in the execution of an execution production order.

The top half of FIG. 3 shows the execution view of the routing 300, and includes all of the detailed execution-level operations of the routing 300 and the interrelationships between the execution-level operations as defined in the routing 300. Also shown on the top half of FIG. 3 are the defined production steps 320 and 322, which are aggregations of the execution-level operations as defined by the PStep markers 318 and 316. The bottom half of FIG. 3 shows the defined planning-level, or rough-cut, operations, which are aggregations of the execution-level operations as defined by the PA (planning activity) markers 324, 318 and 316, in connection with start marker 314.

In the depicted example, the execution view of the routing 300 includes an operation drilling 306, an operation grinding 308, an operation assembly 310, and an operation packing 310. In some embodiments, a routing may be defined by a start mark 314 and an end mark 316, which defines the borders of planning activities and production order.

In some embodiments, a grouping element, called a marker, for planning and execution purposes may be defined to flexibly divide a routing into several production steps and planning activities. A user may define a marker to serve many different functions. In one example, a user may define a planning mark that serves as a border of a planning operation. In another example, a user may define an execution marker to define the border of a production step. In a further example, a user may define a marker as a reporting point to indicate a time for counting actual production quantities in the production process. If there is no marker in a routing, then the whole routing may be defined as a single production step or a single planning activity. A user may define and understand, through the use of the markers, the main material flow and main sequence of a routing.

In the example in FIG. 3, a default may be predefined with the start mark 314 and the end marker 316 originally set to group all defined execution operations into a single step. A user may place a marker 318 in the routing 300 to define a first production step 320 and a second production step 322. As shown in FIG. 3, the production step 320 may include the operation 306, the operation 308 and the operation 310, which are bracketed by the start marker 314 and the marker 318. The production step 322 may include the operation 312, which is bracketed by the marker 318 and the end marker 316.

The routing 300 also includes a user-selected marker 324 that together with the start marker 314, the marker 318, and the end marker 316 define three planning-level, or rough-cut, operations 326, 328, 330. The planning operation 326 may include the operation 306 and the operation 308, which are bracketed by the start marker 314 and the marker 324. The planning operation 328 may include the operation 310, which is bracketed by the marker 324 and the marker 318. The planning operation 330 may include the operation 312, which is bracketed by the start marker 318 and the end marker 316.

Referring now to FIGS. 4A-4E, there are several flowcharts that illustrate operation of the system of FIGS. 1A-D in performing manufacturing planning. Starting with FIG. 4A, there is shown a flowchart of major steps in a computer-implemented method for first, generating planning-level master data and, second, using the generated planning-level master data in performing a planning process. The method shown in FIG. 4A may be performed, for example, by the supply planning component 108 of the FIG. 1A system 102.

First, in step 402, user definitions of groupings of execution-level entities are received. The execution-level entities may be, for example, execution-level operations, such as the operations illustrated in the execution view 208 of FIG. 2. This may be done, for example, by setting planning activity markers, as illustrated in FIG. 3. Additionally or alternatively, the execution-level entities may be execution-level resources, such as human resources or machines and other equipment to perform manufacturing functions. In this case, the resources included in the grouping may be similar resources that may be considered as a single resource for planning purposes. The user definitions may be entered, for example, using the client device 113 shown in FIG. 1A.

Next, in step 404, there is performed various aggregations using the user groupings defined in step 402. This is done as part of a process of generating the planning-level master data that later will be used in performing a manufacturing planning process for a particular demand input. Several different types of aggregations may be performed. First, there may be an aggregation of time duration information associated with execution-level operations that are grouped into a single planning-level operation, so that there is aggregated time duration information associated with the planning-level operation. Second, there may be an aggregation of resource capacity requirements associated with execution-level resources that are consumed in one of the grouped execution-level operations and that are defined to be included in a planning level resource. The execution-level resource requirements that are aggregated may be associated with the same execution-level resource but which are consumed in different grouped execution-level operations, and may be associated with different execution-level resources that are grouped together as a single planning-level resource. Third, where there is a grouping in step 402 of different execution-level resources into a single planning-level resource, there may be an aggregation a capacity supply associated with each of the grouped execution-level resources to define a capacity supply for the defined planning-level resource. The aggregation function of step 404 may be performed, for example, using the aggregation engine 106 shown in FIGS. 1A and 1B, using the aggregation rules and parameters 107 that have been configured for the aggregation engine 106 (for example, with the rules being pre-configured rules for how aggregations are performed and the parameters being user-defined information, such as the groupings defined in step 402). Steps 402 and 404, together, generate the planning-level master data from the execution-level master data.

The configuration steps of 402 and 404 may be performed one time for several planning processes. In other words, the groupings may be defined and planning-level master data generated once, and that same planning-level master data may be used in planning processes for different manufacturing orders. In addition, multiple sets of planning-level master data may be generated for different granularities of users, and then the planning user performing a particular planning task may select one of the granularity levels to use in the planning process.

The planning process of steps 406 and 408 may be performed, for example, by the supply planning component 108 of the FIG. 1A system 102. In step 406, the planning process begins with generating a planning order for a particular demand input that may, for example, identify the product to be manufactured, a quantity to be manufactured, and a requested delivery or completion date. The planning order is generated using the planning-level master data. This function may be performed, in one implementation, without user involvement, or in other words, the planning order may be generated automatically. This step 406 may produce, for example, time duration measures for each of the defined planning-level, or rough-cut, operations and time relationships between the rough-cut operations. In addition, the step 406 may produce capacity requirements for defined planning-level resources, which may include capacity requirements for defined groups of resources. It may be noted that duration, time relationships and capacity requirements are generated from the predefined master data by multiplying pre-aggregated variables by the order quantity, although in addition to variable parameters, there also may be fixed parameters that are included in the calculations.

Next, in step 408, the generated planning order is scheduled. This step may be performed either automatically or with user involvement. In one implementation, the generated rough-cut operations, including calculated intra-operation time durations and inter-operation timing relationships, are scheduled in a unified planning calendar that includes already scheduled operations for other demand inputs. By way of example, such a calendar may simply be something that identifies working and non-working times. In addition, the resource capacity requirements, in one implementation, are scheduled in a calendar for the particular planning-level resource.

After step 408, the planning order may be released in step 410. This generally occurs just before the planning order needs to be executed. It may be desirable to not release the planning order earlier than needed because the planning order may be revised in view of later orders that are planned and scheduled. Once the planning order is released in step 410, an execution order may be generated as briefly described previously, and as will be described in more detail later.

Figure 4A:
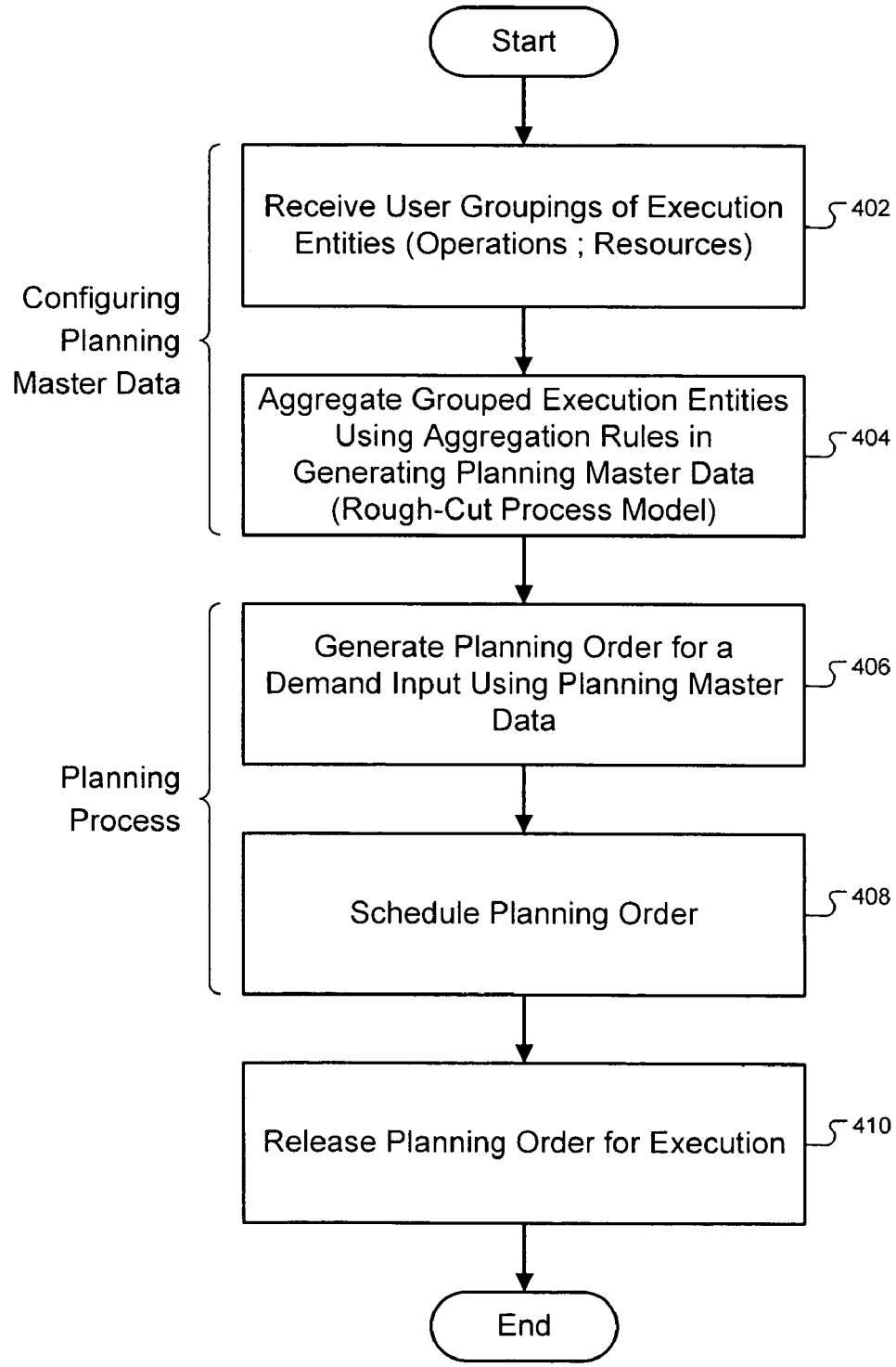
FIG. 4A is a flowchart showing a computer-implemented method for generating and using planning-level master data.
Figure 4B:
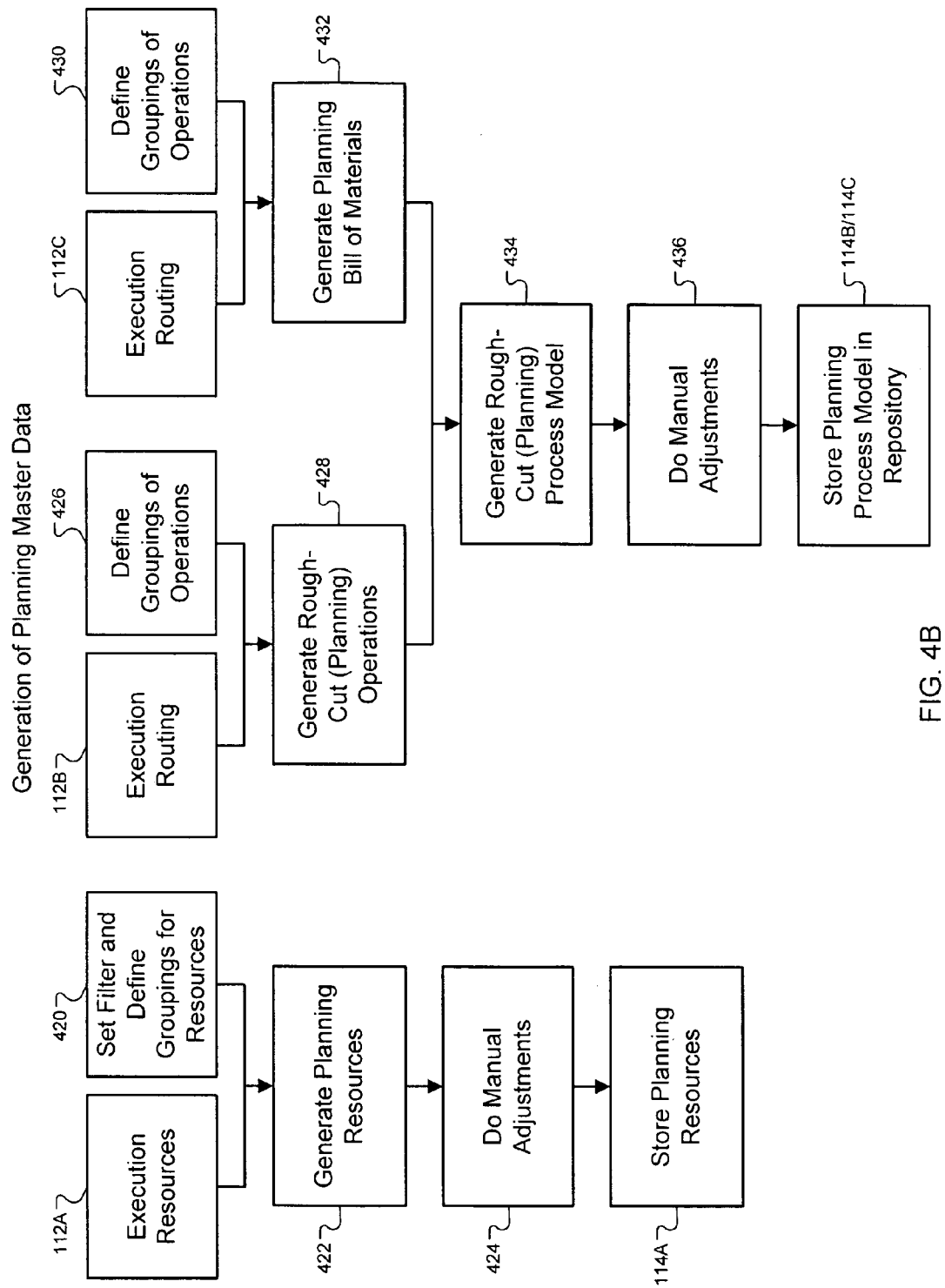
FIG. 4B is a flowchart showing a computer-implemented method for generating planning master data from execution master data.

Referring now to FIG. 4B, there is shown a more detailed flowchart of the computer-implemented method for generating the planning-level master data, which may also be called a rough-cut process model. The flowchart illustrates that the order in which may of the steps are performed is of no consequence, and given that the process may involve user involvement, the order in which the steps are performed may be determined by the user. Also, it can be seen that the execution-level master data of execution resources 112a (see FIG. 1B), execution routing 112b, and execution bill of material (BOM) 112c are inputs to the method. Beginning the discussion with step 420, resource filters are set and groupings of execution-level resources 112a are defined. This may involve user input to identify the execution-level resources that are not needed for planning purposes, and user input to identify different execution-level resources that are to be grouped to define a single planning-level resource. Once the filters are set and the groupings are defined, the planning-level resources are generated at step 422. Where different execution-level resources are grouped to define a planning-level resource, the step 422 of generating the planning-level resources may involve aggregating capacity supply information associated with each of the execution-level resources that are grouped into the planning-level, so there is determined an aggregated capacity supply for the planning-level resource. There may also be additional manual user adjustments at step 424 to the generated planning-level resources before the planning resources 114a in master data repository 110 (see FIG. 1B).

Moving now to step 426, groupings of execution-level operations from the execution routing 112b are defined. The execution-level operation may be similar to those illustrated in the execution view 208 of FIG. 2. This may be done, for example, by setting planning activity markers, as illustrated in FIG. 3. Next, in step 428, the rough cut, or planning-level, operations are generated at step 428. This step 428 will use the execution routing 112b, the planning resources generated at step 422, and the groupings defined in step 426. This step 428 may involve aggregation of information again. For example as described previously, there may be an aggregation of resource capacity requirement information to determine an aggregated resource requirement for a planning-level resource for each of the planning operations, and there may be an aggregation of time duration information to determine aggregated time duration information for each of the planning operations.

Turning now to step 430, a filter for materials is set. This may involve user input to identify the execution-level materials that are not needed to be considered for planning purposes. Then, at step 432, a planning-level bill of materials is generated. From the generated rough cut operations and the generated planning level bill of materials, a rough-cut (planning) process model is generated at step 434. Again, there may be user adjustment to the rough-cut process model at step 436. The rough-cut process model is then stored in master data repository 110 (see FIG. 1B). While the routing and BOM data are shown as separate entities in the master data repository 110, the routing an BOM data in one implementation is structured in an inter-related way such that together they make up a rough-cut process model.

Figure 4C:
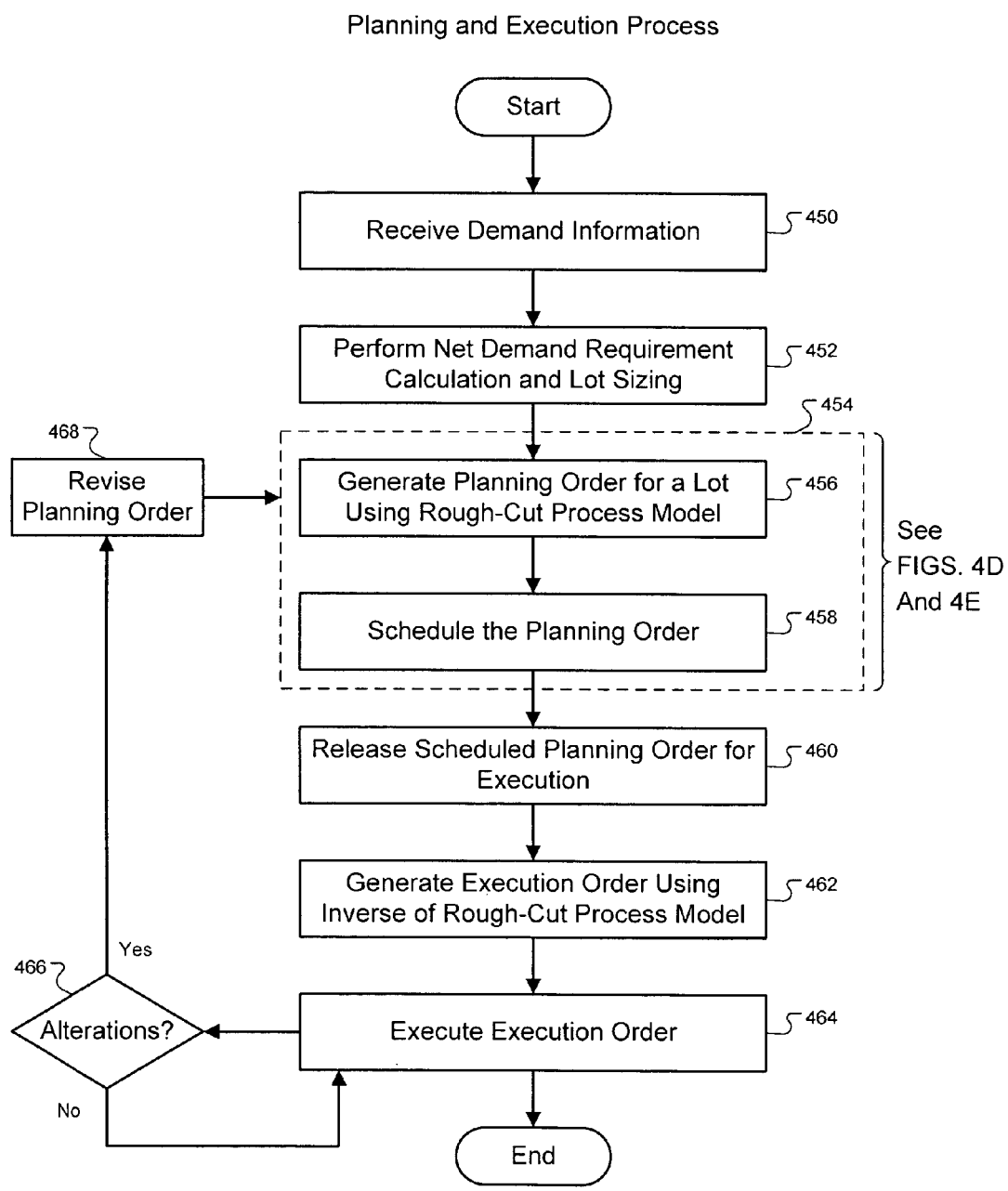
FIG. 4C is a flowchart of a computer-implemented method for planning and executing a manufacturing process.

Referring now to FIG. 4C, there is shown a flowchart that illustrates a computer-implemented method for planning and executing a manufacturing order. First, in step 450, the method begins with receipt of demand information. The demand information may include, for example, a customer order and forecasted information. The demand information may include, for example, an identification of the products to be supplied, the quantity to be supplied, and a requested date for delivery.

Before starting the planning process, in step 452 there is performed a process for determining, firstly, a net demand requirement, and secondly, manufacturing lots. Net demand may be determined because, for example, there may already be goods in inventory or in process of being manufactured that may be used to satisfy the demand information received in step 450. The net demand requirement may then be divided into multiple manufacturing lots using a lot-sizing process. The lot then becomes the subject of a production order in later steps of the process. It will be appreciated that there may be a looping through step 452 and the following step 454 in a case where materials requirement planning logic is employed. The step 454 may be performed multiple times for intermediate materials included in a multi-level bill of material, for example. The step 454 that follows is from the perspective of a single product being planned.

Figure 4D:
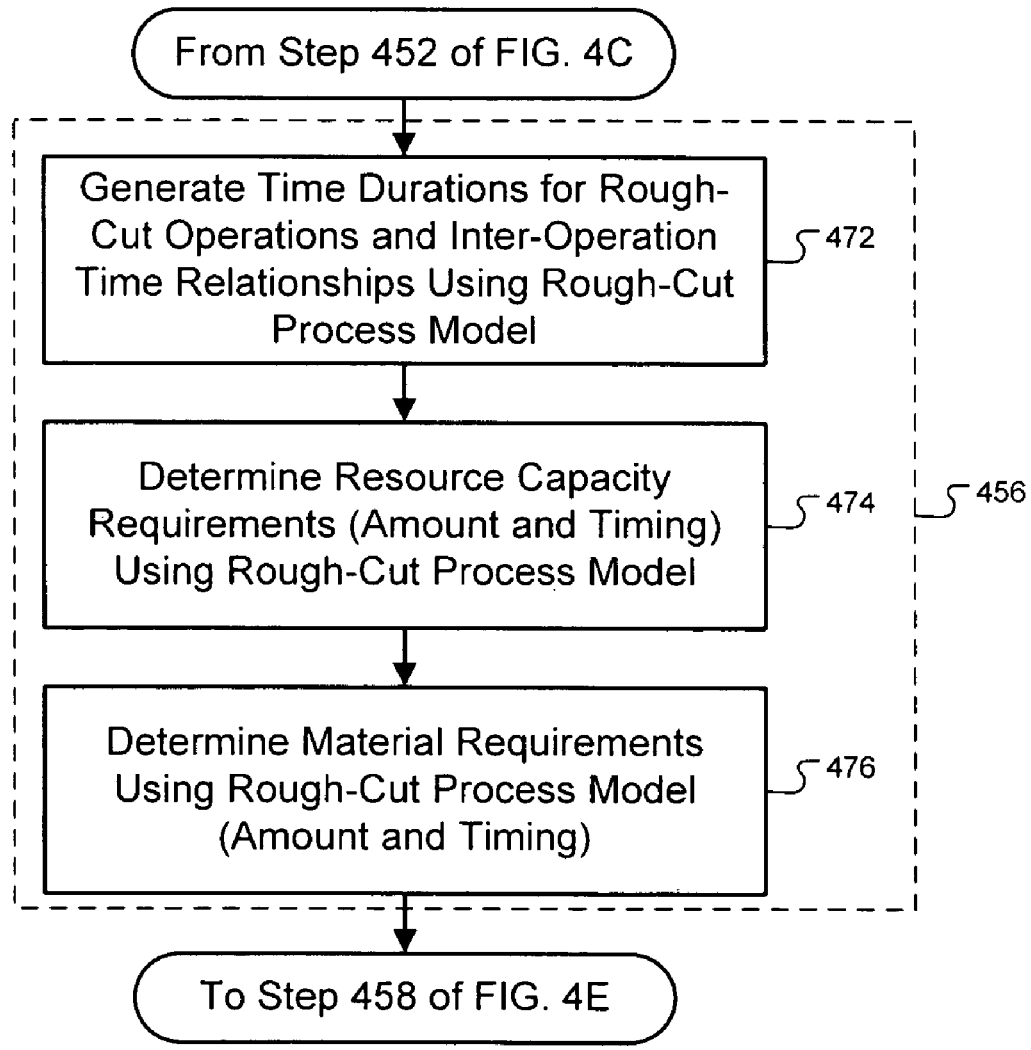
FIGS. 4D-E are a flowcharts with further details of an example method used in the method of FIG. 4C.
Figure 4E:
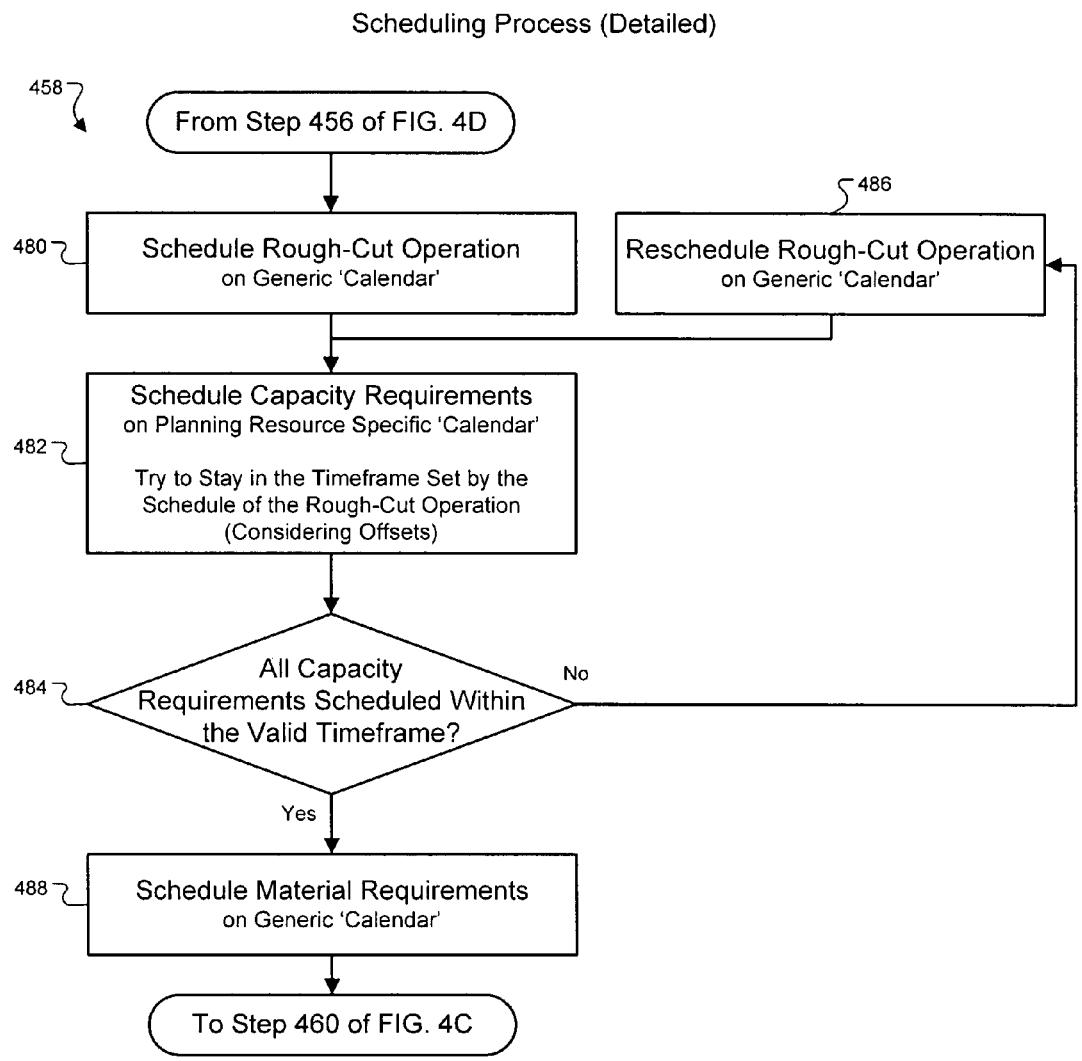

Next, the method proceeds to step 454 where a planning process on the lot is performed. The details of step 454 are shown in FIGS. 4D-E. For present purposes as shown in FIG. 4C, the planning process 454 includes a step 456 of generating a planning order for the lot using the rough-cut planning model. Then at step 458 the planning order is scheduled. At some point after the planning process is complete, the scheduled planning order is released for execution in step 460. After the scheduled planning order is released, an execution production order is generated at step 462. This may be done, in one implementation, by using the execution-level master data, and performing scheduling of execution operations and resource and material requirements that are consistent with the scheduling contained in the planning order. In addition, an inverse of the rough-cut process model may be used in the process of translating the scheduling parameters of the planning order to the scheduling for the execution order.

FIG. 4C also illustrates that the execution order may be altered at some point after the planning order has been released. In this case, it may be detected if there are alternations at step 466. If so, then a process may be initiated so that at step 468 the planning order may be revised. This may be desirable because even released planning orders constrain times in which future manufacturing lot operations may be scheduled.

Referring now to FIG. 4D, the details of the planning process 456 of FIG. 4C are shown. The first major step 456 involves, generally, the generation of the rough-cut operations and resource capacity and material requirements. The main variable in these calculations will be the quantity of product to be produced for the lot. Step 456 begins with sub-step 472 where time durations are generated, or calculated, for each of the rough-cut operations, and in addition, inter-operation time relationships are determined. These time measures are calculated using the rough-cut process model.

Next, in step 474, planning-level resource capacity requirements are calculated. This will be done for all execution resources that are defined to not be filtered, for example, in step 420 of the FIG. 4B method, and in addition, it is performed for defined groups of execution resources that are defined as a single planning resource. In this step 474, both the amount of the capacity required and the timing for when the capacity is needed within the duration of its planning operation is determined. Again, this is determined using the rough-cut process model. In one implementation that will be described in more detail later, the timing of the resource capacity requirement will fall or occur within the time-frame for a rough-cut operation in which the resource is used. In addition, timing offsets for the resource capacity requirement within the duration of the rough-cut operation may be generated or defined, such as in step 428 of the FIG. 4B method. Details of how the offsets are defined and used will be described later. Next, in step 476, material requirements are determined for unfiltered planning-level resources using the rough cut process model.

The method then proceeds to the step 458 of scheduling the order, the details for which are shown in FIG. 4E. The scheduling step 458 begins with step 480 where the rough-cut operations are scheduled in a generic calendar. As described previously, the calendar may simply be something that indicates working times and non-working times. Next, in step 482, the resource capacity requirements are scheduled in the appropriate planning-level resource calendar. In a case where the planning resource is a single execution resource that is not filtered, the resource calendar used in planning may actually be an execution calendar for the resource. In a case where the planning resource is an aggregation of multiple execution resources, a virtual planning calendar for the planning resource may be used, and then that planning calendar may be translated to individual execution calendars when the execution order is generated.

As indicated in the figure, in step 482 there is an attempt to stay in the timeframe set by the schedule of the rough cut operation, considering the offsets for the resource capacity requirements. Next, at step 484, it is determined whether or not all of the planning-level capacity requirements are scheduled within a valid timeframe. If not, processing proceeds to step 486 where the rough cut operation is rescheduled on the generic calendar. Once that is done, processing proceeds again to step 482 where the capacity requirements are attempted to be scheduled again within a valid timeframe. If that is possible as determined at step 484, processing proceeds to step 488, and the material requirements are scheduled on a generic calendar. The method then proceeds to step 460 of the method shown in FIG. 4C.

Figure 5:
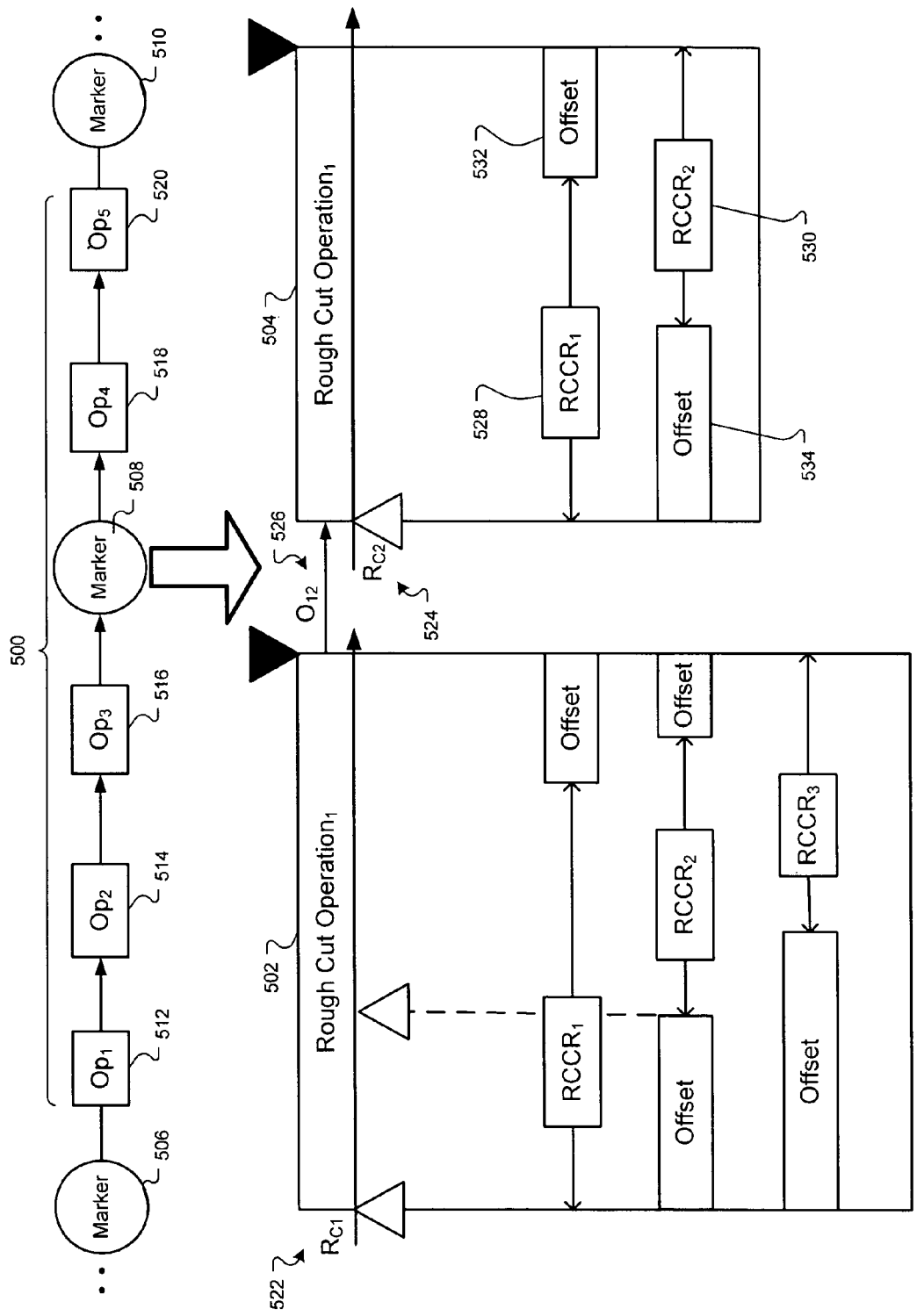
FIG. 5 is a diagram showing an example execution routing of a manufacturing process and a planning routing, including rough-cut operations, generated from the execution routing.

Referring now to FIG. 5, an exemplary operation sequence 500 in an execution routing is shown, along with two corresponding rough-cut operations. As discussed previously, a user may group execution operations into planning, or rough-cut, operations 502 and 504 by placement of a marker 508 in the master data. In this example, a user may group the consecutive operations 512, 514 and 516 into a first rough-cut operation 502 and the consecutive operations 518 and 520 into a second rough-cut operation 504. In configuring the planning-level master data, parameters may be configured to establish time duration parameters both for the duration of a particular rough-cut operation and time duration parameters for inter-operation time relationships.

The inverted dark triangles, one being associated with a rough cut operation, represents the output product for the operation, whether it be an intermediate product in the case of operation 502 or a final product in the case of operation 504 (assuming operation 504 is the final operation of the manufacturing process). The un-shaded triangles pointing to the rough-cut operation header indicate an input material and a time at which the input material is needed. The symbols $R_{C1}$ and $R_{C2}$ associated, respectively, with the first and second rough cut operations 502 and 504 are symbols for generic calendars that are the basis for scheduling the duration of the rough-cut operations.

With respect to the inter-operation time relationship, the relationship between two rough-cut operations may be such that a subsequent rough-cut operation may start before a previous rough-cut operation ends. Alternatively, as is the case in the FIG. 5 example, the second rough-cut operation 504 may occur at some time duration after the first rough-cut operation 502 is completed. In this situation, the time relationship between to the two rough-cut operations 502 and 504 may be referred to as an offset $O_{12}$ 526. In addition, there may be many ways to specify a time relationship between the two rough-cut operations 502 and 504. For example, the time relationship may be measured from the start of the first rough-cut operation 502 to the start of the second rough-cut operation 504, or from the end of the first rough-cut operation 520 to the start of the second rough-cut operation. Other time relationship end points may also be used. In the example shown in FIG. 5, the offset 526 is an end-start time relationship between the two rough-cut operations 502 and 504.

The supply planning component 108 may compute or otherwise obtain the time duration measures for an actual production lot being planned during the planning process. In one example, the inter-operation time relationship 526 may be modeled as a linear function with respect to a quantity to be produced. In another example, the inter-operation time relationship 526 may be fixed and stored in the planning view routing information in the database 110 (FIG. 1A).

The rough-cut operation structure depicted in FIG. 5 also illustrates that resource capacity requirement that arise in operations aggregated into a rough-cut operation are associated with the rough-cut operation in which the requirements arise. In this example, the rough-cut operation 502 has three rough-cut capacity requirements (RCCR) associated with it. There may be more resource capacity requirements imposed by the execution operations that are aggregated into the rough-cut operation 502, but those resource capacity requirements may have been defined to be filtered in the process as not being planning relevant, as discussed previously. In addition, there may be a grouping of multiple execution-level resources to define a single planning-level resource. The second rough-cut operation 504 includes rough-cut capacity requirement (RCCR) 528 and another RCCR 530. As discussed previously, the planning-level master data may provide parameters for each of the rough-cut capacity requirements that are necessary to calculate the capacity requirements during a planning process for a particular production lot.

The rough-cut planning structure shown in FIG. 5 also makes use of intra-operation time offsets to impose an additional time constraint on when the resource capacity is going to be required during the course of the rough-cut operation. For example, a first $RCCR_1$ 528 for rough-cut operation 504 has an offset 532 from the end of the rough-cut operation 504. This means that, for planning purposes, the first $RCCR_1$ are going to be required during a time period extending from the beginning of the rough-cut operation to the start of where the offset 532 begins. As such, it may be that the $RCCR_1$ 528 may be required during execution operation 518, and so the $RCCR_1$ 528 will be needed, generally, in the first half of the rough-cut operation 504. By using the offset 532, the $RCCR_1$ 528 is constrained to be scheduled not only within the time constraints of when the rough-cut operation 504 is scheduled, but also within the additional time constraint imposed by the offset 532. A second $RCCR_2$ 530 for the second rough-cut operation 504 has an offset 534 that extends from the beginning of the rough-cut operation 504 to roughly half way through the rough-cut operation 504. As such, the $RCCR_2$ 530 is constrained to be scheduled within generally the latter half of the rough-cut operation 504 time duration. This may be, for example, that the $RCCR_2$ 530 is imposed by the execution operation 520.

As discussed previously, there may be RCCRs that are aggregations of resource capacity requirements that arise in multiple execution operations but in the same rough-cut operation. These aggregated resource capacity requirements may be viewed as a single RCCR, although it still may be desirable in some cases to impose offsets to further restrict the time during which the RCCR may be scheduled in a planning-level calendar for the aggregated resource.

A RCCR, as is the case with $RCCR_1$ 528, generally may have a time duration associated with it that is shorter than a time period imposed by the rough-cut operation and any offsets. This provides some level of flexibility in scheduling or loading the capacity requirements on the corresponding resources. In some cases, the constraints imposed by the offsets may be tightened or relaxed, dependent on how little time or how much extra time a planner may want to provide to ensure that execution is performed within time frames that are planned.n planning and execution.

Figure 6:
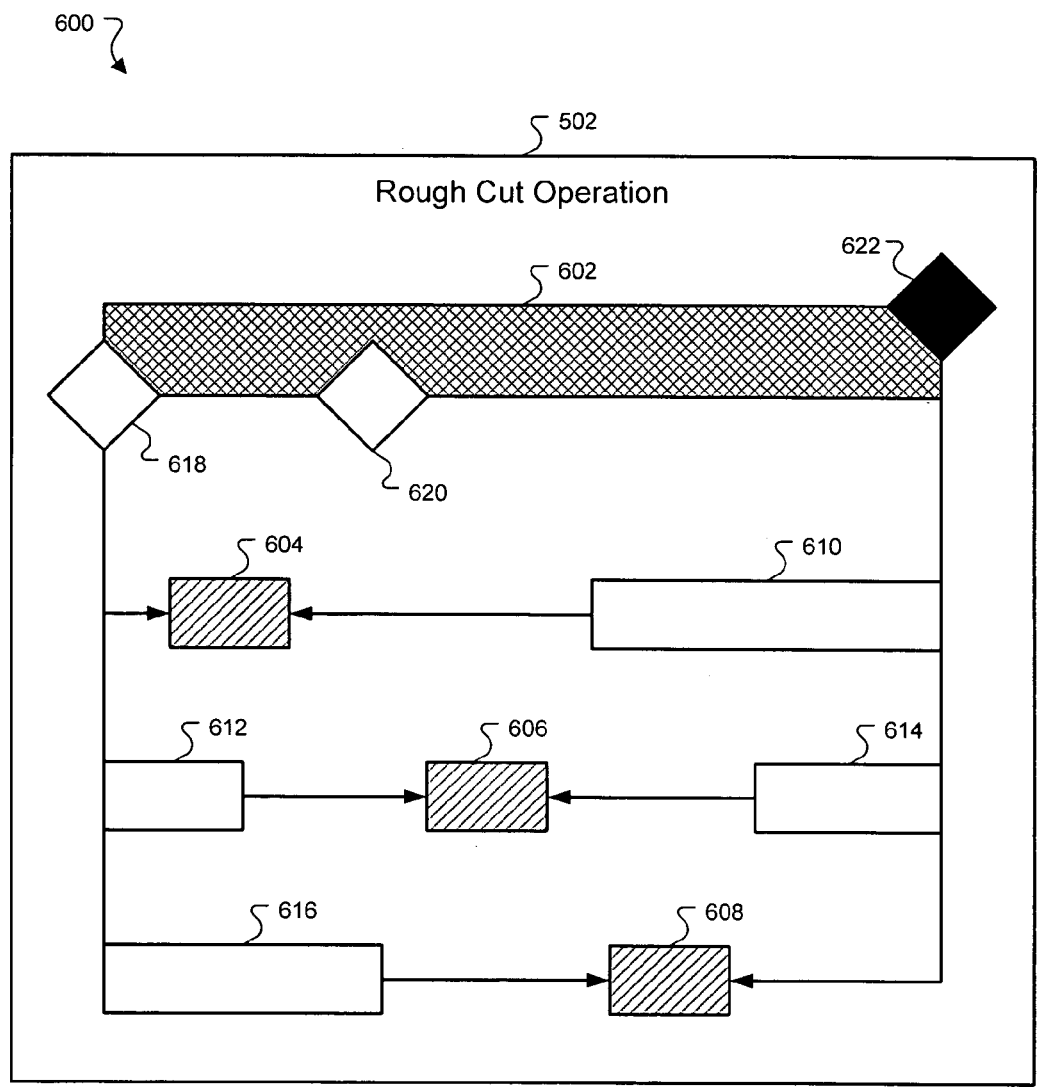
FIG. 6 is a diagram of an exemplary data structure of a rough-cut operation.

Referring now to FIG. 6, an exemplary data structure 600 of the rough-cut operation 502 is shown. Different operations, user selections, and other factors may result in different arrangements of the data structure 600. The rough-cut operation 502 includes a header activity duration 602. The header activity duration 602 represents a planned time that the planning-level operation is expected to take. The duration 602 may comprise a lead time of one or more execution operations that are aggregated in the rough-cut operation 502. For example, in the rough-cut operation 502 shown in FIG. 6, the header activity duration 602 may include the lead time of the operations 512, 514 and 516 shown in FIG. 5. Additional to the processing time of the execution operations, the header activity duration 602 may also include some amount of buffer time. The buffer time provides some amount of time beyond that which is absolutely needed to perform the execution operations.

The rough-cut operation 502 includes RCCRs 604, 606 and 608. The RCCRs 604, 606, 608 may only include the capacity requirements for planning-relevant operations. For example, the RCCR 604 may be modeled in a single requirement that may only include the planning relevant requirements in a setup requirement, a produce requirement, and a teardown requirement of the operation 512. In the depicted embodiment, the RCCRs 604, 606 and 608 are not related to each other. Therefore, there is no time relationship that links the RCCRs 604, 606, 608 together to establish an exact sequence of capacity requirements (similar to the sequence of execution operations for which the capacity is needed). A rough sequential relationship may be established by the aid of offsets.

The rough-cut operation 502 includes offsets 610, 612, 614 and 616 to impose a rough sequential relationship between the RCCRs 604, 606 and 608. The offsets 610, 612, 614 and 616 may specify time relationships between the RCCRs 604, 606 and 608 and the header activity duration 602. In one example, the offset 612 may specify a time relationship between the start of the rough-cut operation 502 and the (from a planning perspective) earliest start of the execution of the operations that cause the RCCR 606. In another example, the offset 614 may specify a time relationship between the end of the operation of the RCCR 606 and the end of the rough-cut operation 502. By adjusting the offsets 610, 612, 614 and 616, the sequential relationships between the RCCRs 604, 606 and 608 may be established. For example, the supply planning module 108 may specify the operation represented by the RCCR 608 to be executed later than the operation represented by the RCCR 606 by specifying the offset 616 to be longer than the offset 612. The offsets 610, 612, 614 and 616 may be automatically set in the routing database 110 (FIG. 1A) and manually adjusted by planning users. A user may decrease the value of the offsets 610, 612, 614 and 616 to increase the chance that the rough-cut operation can be scheduled in time. A user may also increase the value of the offsets 610, 612, 614 and 616 to boost the likelihood of feasibility of the generated plan.

Some rough-cut operations may include one or more input nodes, and/or one or more output nodes. In this example, the rough-cut operation 502 includes two input nodes 618 and 620, and an output node 622. The input nodes 618 and 620 and the output node 622 represent the material inflow and material outflow during the rough-cut operation 502. The input nodes 618 and 620 and the output node 622 are linked to the header activity duration 602 to provide positive or negative offsets in the rough-cut operations 502. Further, in some embodiments, the input nodes 618 and 620 and the output node 622 may provide a link for the rough-cut operation 502 to link with other planning documents (e.g., rough-cut operations in other levels, external procurement proposals, purchase orders), which may include input or output nodes in their structure. For example, a purchase order may include the input node 618. When the supply planning module 108 schedules the rough-cut operation 502 to be executed in a specific time, the processing platform 102 may use to link provided by the input node 618 to find out that the purchase order may also need to be scheduled to provide the required material for the rough-cut operation 502.

Figure 7:
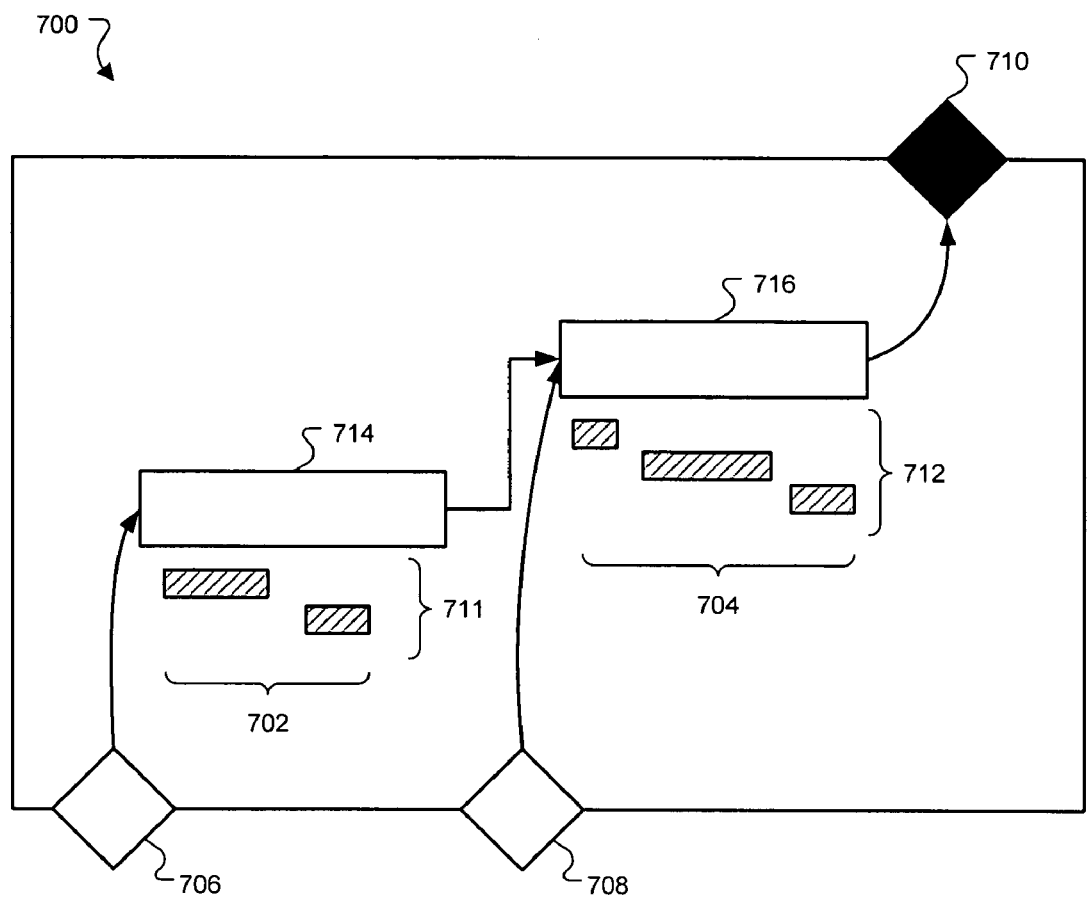
FIG. 7 is a diagram of an exemplary data structure for a planning process model.

FIG. 7 shows an exemplary planned production order 700 that may be generated by the supply planning module 108 during planning operation. In this particular example, the planned production order 700 includes two rough-cut operations 702 and 704. The planned production order 700 also includes input nodes 706 and 708, and an output node 710 that may show the material input and end-product output in the planned production order 700. The rough-cut operations 702 and 704 may include RCCRs 710 and 712, and header activity durations 714 and 716.

In some embodiments, a planning algorithm may generate a timing schedule and a capacity requirement schedule using the information given in the exemplary planned production order 700. Time scheduling of the planning algorithm may work only with the header activity durations 714 and 716. The header activity durations 714 and 716 may represent the durations of the rough-cut operations 702 and 704 as a whole. A planning user or the planning algorithm may perform actions, such as, deletion, rescheduling, mode selection, on the header activity durations 714 and 716. For example, a user may delete a RCCR of a rough-cut operation is the user deems the RCCR to be not planning relevant. In another example, a user may reschedule the header activity duration 714 by rescheduling the occurrence of the rough-cut operation 702. In a further example, a user may change a header activity by selecting different modes in execution operation.

Capacity requirement scheduling of the planning algorithm may be related to the RCCRs 710 and 712. In one implementation, a capacity requirement from a supply planning point of view is a requirement of a production planning order for a resource, such as machine tools or human resources. These resource capacity requirements are derived from the RCCRs. A material requirement is a requirement for raw materials or semi-finished goods, for example. The material requirements are derived or calculated, in this example, from the input nodes of the rough-cut operations. A planning user may not be able to adjust the RCCRs 710 and 712 directly. However, in some embodiments, the actions performed on the header activity durations 714 and 716 may trigger automatic adjustments on the RCCRs 710 and 712. For example, the material requirement schedule related to the RCCRs 710 may change if a user reschedules the rough-cut operation 702. During planning, some rough-cut operations may not be scheduled due to, for example, lack of capacity or other constraints. In this case, in some embodiments, the planning algorithm may automatically reduce buffer time to fit the rough-cut operation into the constraints. While in one implementation a planning user may not be able to break a rough-cut operation into smaller operations for scheduling, a RCCR may, in some implementations, be broken into smaller units for that purpose.

While the data structures shown in the examples of FIGS. 5 to 7 are planning-level manufacturing operations that include an aggregation of a defined group of execution-level manufacturing operations, the same data structures may be used to model execution-level manufacturing operations, execution-level resources, and relationships between execution-level manufacturing operations.

Figure 8:
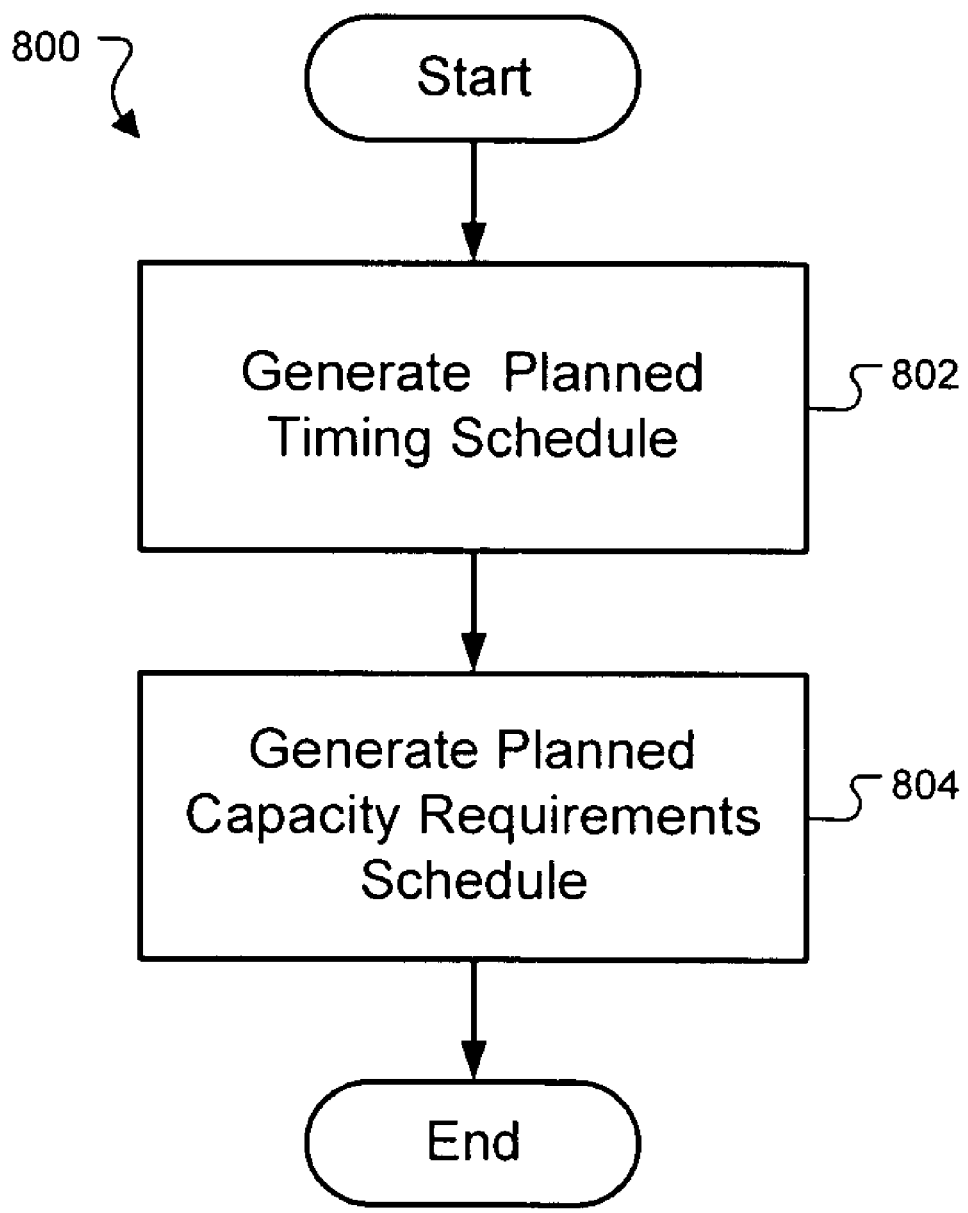
FIG. 8 is a flow chart of a computer-implemented method showing exemplary steps for generating planned production order.

Referring now to FIG. 8, a flow chart is shown that depicts an exemplary method 800 for performing a planning operation for a production process modeled for execution control as multiple separate sequential production operations. The method 800 may be preformed by a manufacturing computing system such as the system 102 in FIG. 1A. In some embodiments, the method 800 may be performed by the system 102 during the execution of the exemplary method 800. In other embodiments, the method 800 may be executed separately when a planning data, such as rough-cut operation routing, demand information, lead-time requirements, capacity requirements, start and end time requirements, and other information, are available. The computing system 102 may then plan and generate a planning document, such as an electronic production order, a purchasing order, or other planning documents, for execution.

In step 802, the method 800 may generate a planned timing schedule for each rough-cut operation to execute a production process to fulfill the received demand information. For example, the method 800 may consider the header activity durations of each of the rough-cut operations in the production process, the timing relationship between the rough-cut operations, and the production capacity of the manufacturing environment 104 to generate a planned timing schedule. In some embodiments, the planning algorithm may use the aggregated duration for each of the rough-cut operations and a manually or automatically selected time relationship between consecutive rough-cut operations to generate the timing schedule.

Separately, the method 800 may, in step 804, generate a planned capacity requirements schedule determined from capacity requirements, such as material requirements or resource requirements, associated with each execution operation and the offset defined for each execution operation. For example, when the method 800 is calculating the material requirements incurred by the rough-cut operation 502, some of the RCCRs 604, 606 and 608 may not contain planning relevant timing information and may be not considered in the timing schedule planning. However, the method 800 may still determine the capacity requirement incurred by the rough-cut operation 502 from the RCCRs 604, 606 and 608 and the offsets 610, 612, 614 and 616. At a later time, the generated timing schedule and the generated capacity requirement may be released to the execution user to perform the production process to fulfill the received demand information, for example, in a production order.

The planned timing schedule generated in step 802 may be a multi-level schedule (for finished products, semi-finished products and raw materials) based on all information (demand, process model, resource calendar which would be a definition of working and non-working times), but in one implementation would not consider the limited capacity supply of the resources (although it would consider the limited supply of materials). The result may be a complete schedule including scheduled material and resource requirements, but resources with limited capacity supply might be overloaded. In this case, the step 804 would then involve a rescheduling of the planned orders in a way that resources with planning-relevant capacity constraints are not overloaded any more (usually leading to a schedule with longer lead times and more late deliveries compared to the result of step 802).

Figure 9:
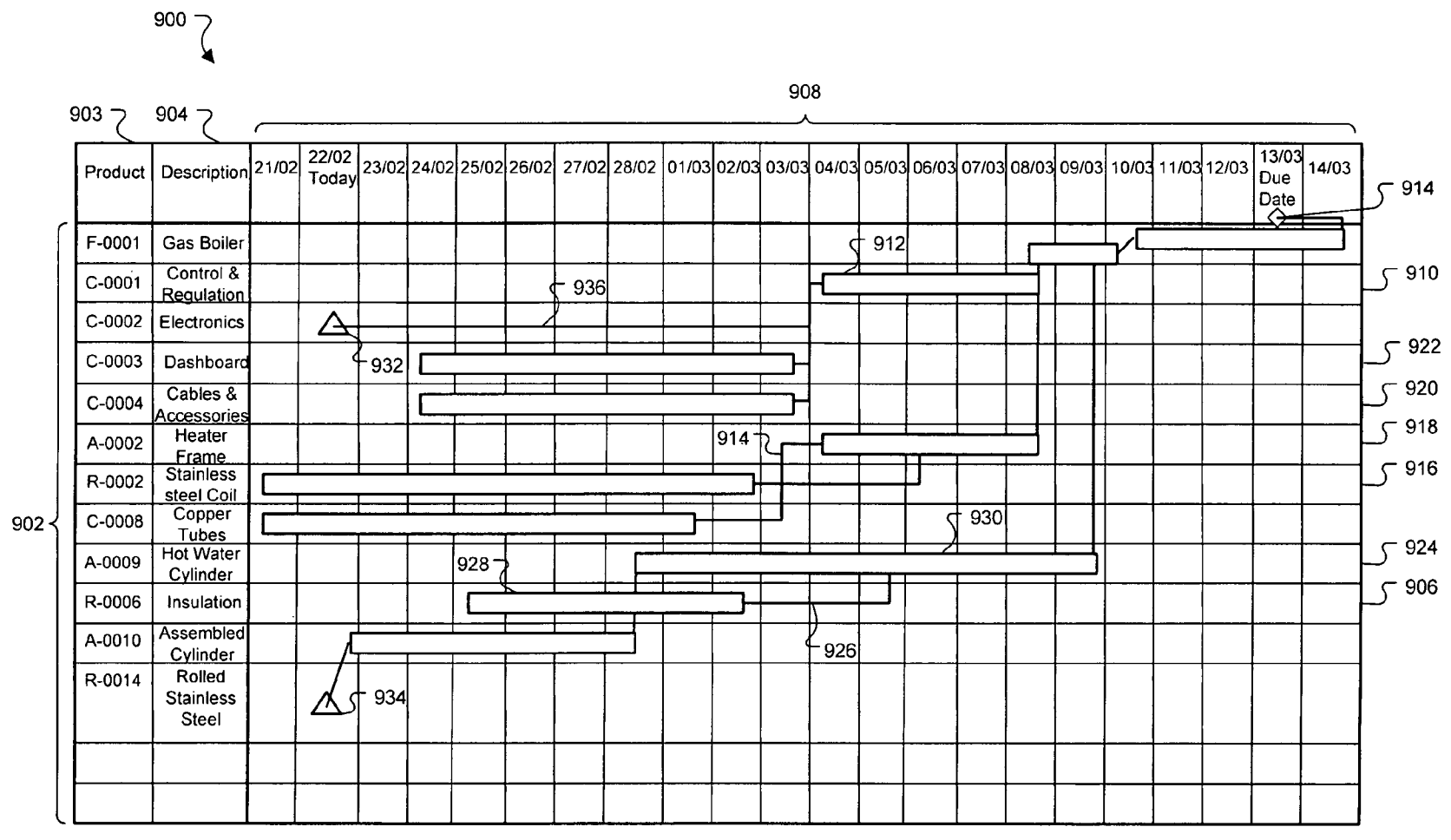

Referring now to FIG. 9, an exemplary Gantt chart 900 may be generated to provide visual presentation of the production process schedule on planning boards. Many different types of such planning boards may be used, and it will be appreciated that such boards may be used to present rough-cut operations as described in this document. A user may visualize the timing of occurrences for material and resource requirements in the Gantt chart 900. In the depicted embodiment, the Gantt chart 900 shows the timing of the material or resource requirement within the rough-cut determined timing. The Gantt chart 900 includes Rows 902 to represent the materials needed to fulfill the production order. The Gantt chart 900 also includes a product column 903 and a description column 904. The product column 903 includes reference numbers of the material in the production order and the description column 904 includes brief descriptions of the material. For example, the row 906 may be for "insulation," which has a product identification of R-0006. The Gantt chart 900 also includes date columns 908 along the top. A scheduled time for each of the included material requirements (indicated by the rows 902) may be represented by an activity bar, which has a left end marks that the expected start date of the planning operation and right end marks the expected completion date of the operation where the material is needed. In some embodiments, the header activity duration 602 (FIG. 6) may directly correspond to the length of the activity bars. As an example, material C-0001 may be used in an operation with a header activity duration of four days. In the Gantt chart 900, an activity bar 912 may indicate that the "control and regulation" material may be expected to be needed during a period from March 4th to March 8th.

The Gantt chart 900 includes lines that connect the activity bars to represent time relationship and material flow relationships. The material requirements in the Gantt chart may run sequentially, in parallel, or overlapping. These relationships between the operations may also be represented by the lines connecting the activity bars in the Gantt chart 900. In one example, an line 914 may indicate a sequential relationship between a material requirement represented by a row 916 and another material requirement represented by a row 918. In another example, the Gantt chart 900 may use a row 920 to represent a material, a diamond 914 as a material requirement, a triangle such as 932 and 934 as a material supply from external procurement, and a rectangle as a complete production order (start date to end date) for the materials named in the row 920 and may have additional inputs (such as material requirements). A material generated by row 922, for example, is shown to be needed at the same time by connecting the end of two activity bars in the rows 920, 922. In a further example, the Gantt chart 900 may indicate an overlapping relationship between the material requirement represented by the row 906 and a material requirement represented by a row 924 by connecting a line 926 from the end of an activity bar 928 to the middle of an activity bar 930. The links between the orders depict the multi-level material flow. Triangles are used to depict that a requirement is supplied from stock.

The Gantt chart 900 includes two material input nodes 932 and 934, which are placed in the expected date of arrival of the materials. The lines in the Gantt chart 900 may indicate the material flow by connecting the material input nodes 932 and 934 to the activity bars. For example, an arc 936 may indicate the material "electronics" may be processed in the activity represent by the row 910. The Gantt chart 900 also includes an output node 938 that is placed on the due date of the production order, indicating the expected release date of the end-product. The Gantt chart 900 includes a line 940 that may indicate the material relationship between the production operations and the end-product. In the depicted example, the end-product may be completed when the rough-cut operation in which 942 is required is completed, which is represented by the arc 940.

It is possible to have a Gantt chart such as that shown in FIG. 9 where in addition one would see rectangles for planning operations and may be rectangles, for example, for capacity requirements (on rows representing planning-level resources). The links between the bars for operations would then be the relationships between the operations as defined in the process model.

Figure 10:
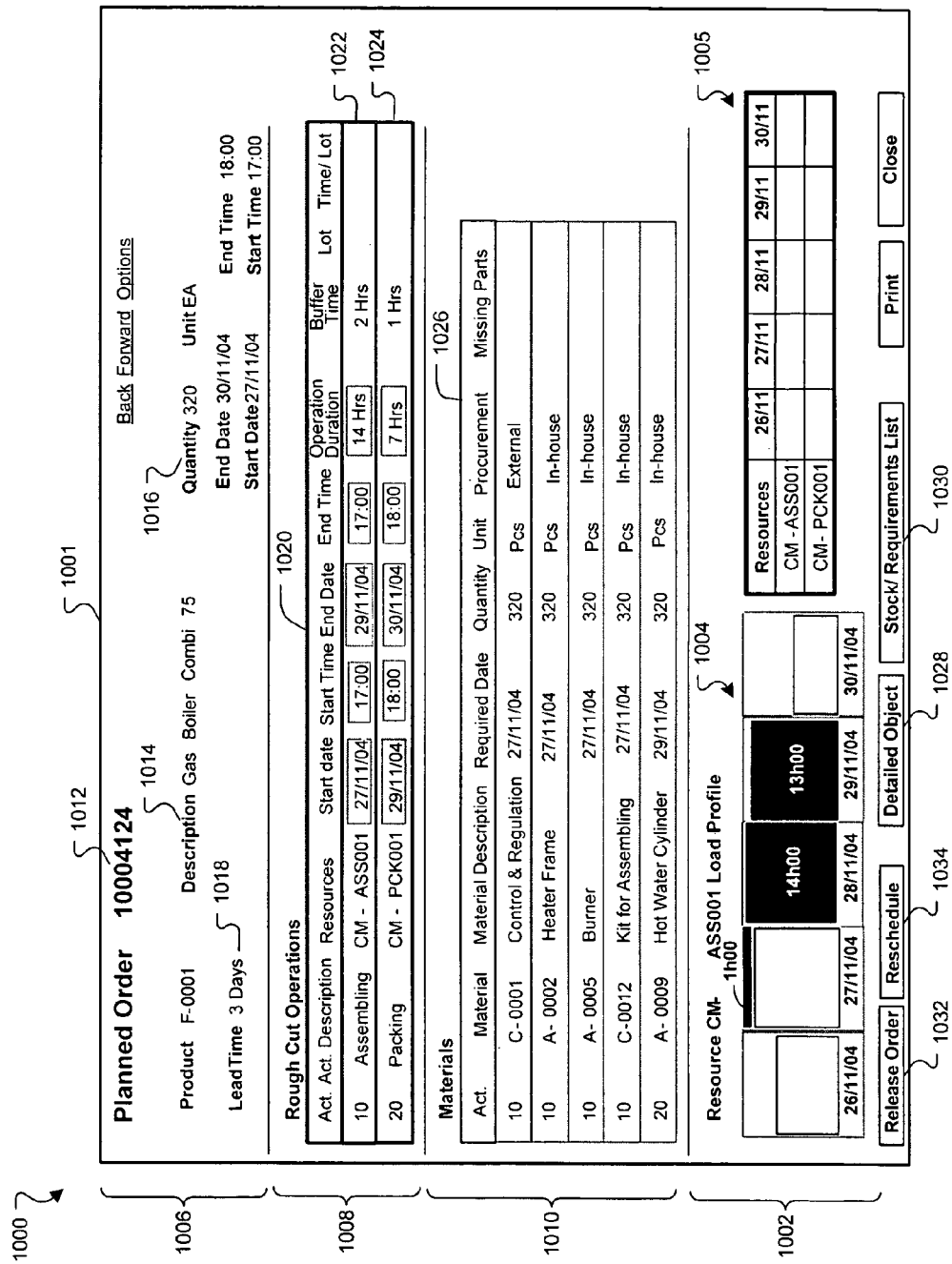
FIG. 10 is a user interface of an exemplary planning document of a production order.

Referring to FIG. 10, a user may visualize an exemplary production order 1000 in a planning document 1001. The planning document 1001 includes a resource area 1002 in which user may visualize RCCRs as capacity load profiles of resources. The planning document 1001 may display a histogram 1004 to show the load profile of the resource usage during the production period. The resource area 1002 may also include a resource table 1005 which may contain information on the resource availability on each day during the scheduled time for production.

A planning user may use the planning document 1001 to obtain a rough idea on the schedule of the production order 1000 in a summary area 1006, details of the rough-cut operations in a rough-cut operation area 1008, and details of the material in a materials area 1010. The summary area 1006 may include an order number 1012 and a description 1014 of the production order 1000. In this example, the production order 1000 is related to a production of gas boiler. The summary area 1006 includes a quantity 1016. For example, the production order 1000 may specify a demand for 320 gas boilers. The summary area 1006 may also include a lead time 1018 that may be the result from rough-cut operation planning. For example, the lead time 1018 may be calculated by adding all rough-cut operations' header activity durations and offset time in the production order. Additionally, the summary area 1006 may also indicate the scheduled start and end time.

The rough-cut operation area 108 includes a table 1020. The table 1020 may include some or all of the rough-cut operations in the production order 1000. In this example, the table 1020 includes two rough-cut operations, an assembling operation 1022 and a packing operation 1024. The table 1020 includes information, such as resources required, scheduled start and end time, operation duration, buffer time, and lot size of the rough-cut operations 1022, 1024. These information may be obtained from the rough-cut operation planning. For example, the buffer time may be obtained from the user during the generation procedure of the planning process model. The materials area 1010 may include a table 1026 that shows information on materials used in the production order 1000. In this example, the table 1026 includes information such as require date, quantity required, and procurement of each of the required materials. The material requirements may be computed separately from the computation of the lead time requirement.

A planning user may obtain addition detail on some of the data by using a detail object button 1028 and a stock/requirements list button 1030. The planning user may select one of the objects, such as the rough-cut operation 1022, and select the button 1028 to show details in the rough-cut operation 1022. For example, information on execution operations included in the rough-cut operation 1022 may be displayed. Also, by selecting the button 1030, the planning user may visualize the list of stock requirement for the production order 1000. A planning user may also use the planning document 1001 to process the planned production order. In this embodiment, the planning document 1001 includes a release order button 1032 and a reschedule button 1034. In one example, if the planning user approves the production order 1000, the planning user may select the release order button 1032 to release the order to the production floor. In another example, if the planning user does not approve schedule of the production order 1000, the planning user may select the reschedule order button 1034 to reschedule the order to another time.

Figure 11:
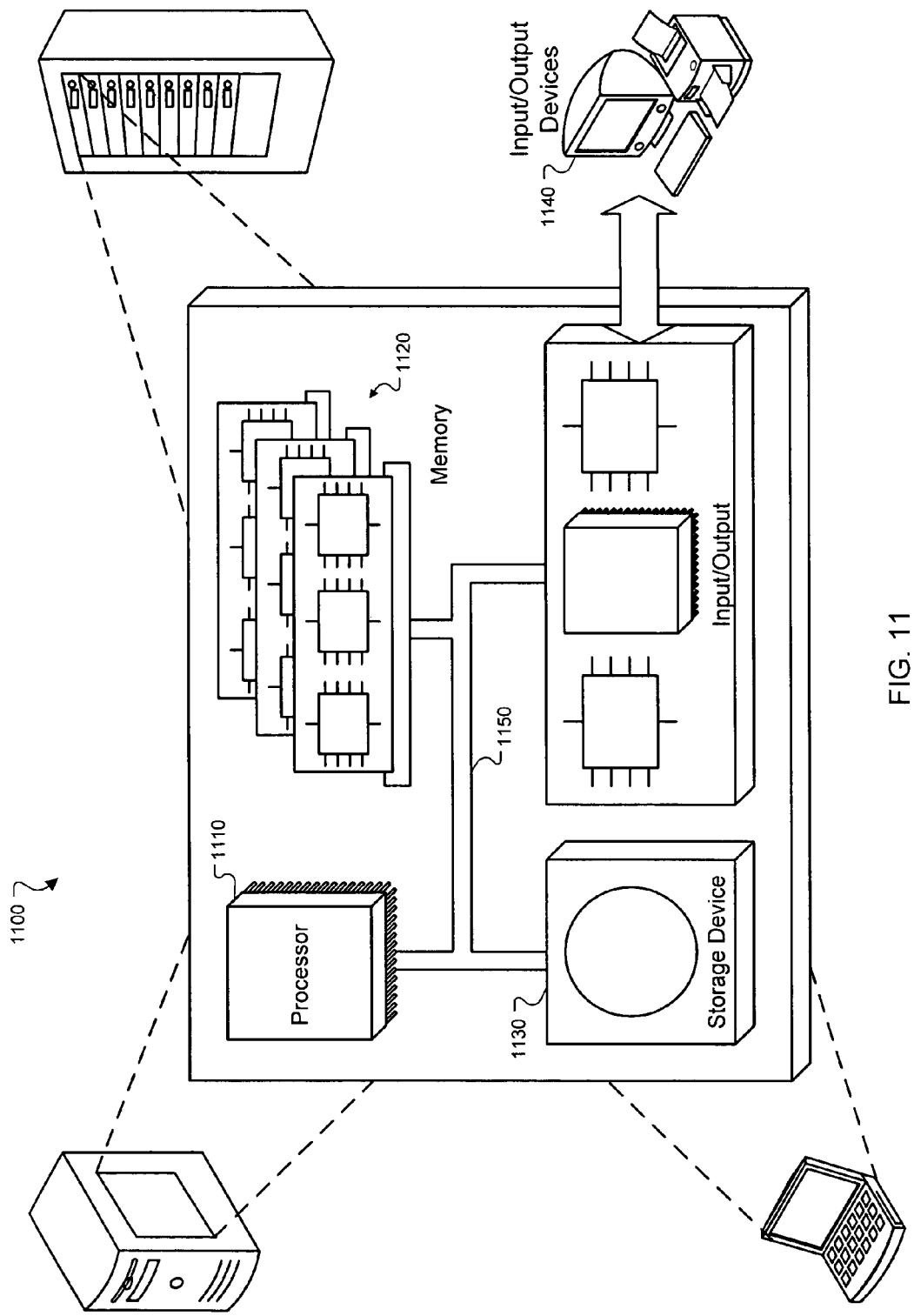
FIG. 11 is a block diagram of a computing system that can be used in connection with the data models and computer-implemented methods described in this document.

FIG. 11 is a schematic diagram of a generic computer system 1100. The system 1100 can be used for the operations described in association with any of the computer-implement methods described previously, according to one implementation. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer program product tangibly embodied in a computer-readable storage medium, wherein the computer program product includes instructions that, when executed by a processor, cause an electronic data structure to be generated and to be populated with information that models a manufacturing process, the data structure and the information comprising:
a header structure comprising planned time duration information for a defined manufacturing operation of the manufacturing process;
a resource capacity requirement structure linked to the header structure and comprising, firstly, planned resource capacity requirement information for a defined resource used in the manufacturing operation, and secondly, planned time refinement information that defines, within the header time duration information, a further refined timeframe during which the defined resource is estimated to be consumed.

2. The computer program product of claim 1, wherein the planned time refinement information comprises a defined offset for the refined timeframe from one of a starting point in time of the manufacturing operation and an ending point in time of the manufacturing operation.

3. The computer program product of claim 1, wherein the planned time refinement information comprises a first defined offset for the refined timeframe from a starting point in time of the manufacturing operation and a second defined offset for the refined timeframe from an ending point in time of the manufacturing operation.

4. The computer program product of claim 1, wherein:
the data structure is used in planning the execution of the manufacturing process;
the defined manufacturing operation is a planning-level operation that comprises an aggregation of a defined group of execution-level manufacturing operations; and
the planned resource capacity requirement information is for a defined planning-level resource, wherein the planned resource capacity requirement information is determined from resource capacity requirement information associated with execution-level resources included in the defined planning level resource and that are associated with the defined group of execution-level manufacturing operations included in the defined planning-level operation.

5. The computer program product of claim 4, wherein the planned time refinement information is determined from an electronic data model that defines a routing of the execution-level operations grouped into the defined planning-level operation.

6. The computer program product of claim 1, wherein the data structure comprises multiple ones of the resource capacity requirement structure for multiple different defined resources that are consumed during the defined manufacturing operation.

7. The computer program product of claim 1, wherein the data structure further comprises multiple ones of the header structure, wherein each of the header structures has one or more linked ones of the resource capacity requirement structure.

8. The computer program product of claim 7, wherein the data structure further comprises an inter-operation timing relationship structure that comprises planned information for a timing relationship between two different defined manufacturing operations.

9. The computer program product of claim 8, wherein the planned timing relationship information comprises time relationship information between an ending point in time for a first one of the defined manufacturing operations to a starting point in time for a second one of the defined manufacturing operations, and wherein the timing relationship information comprises planned time duration information between the ending point in time for the first manufacturing operation and the starting point in time for the second manufacturing operation.

10. The computer program product of claim 1, wherein the data structure further comprises a material requirement structure linked to the header structure and comprising, firstly, planned material requirement information for a defined material input in the manufacturing operation, and secondly, planned time relationship information that defines, within the header time duration information, a further refined timeframe at which the defined material is estimated to be input.

11. The computer program product of claim 4, wherein the defined execution-level operations are defined in a data model for the manufacturing process that is used by a computer-implemented method used in executing the manufacturing process to produce product.

12. The computer program product of claim 1, wherein the planned time duration information comprises information from which a time duration measure is calculable for the defined manufacturing operation for a specified manufacturing order having a specified quantity of product.

13. The computer program product of claim 1, wherein the planned resource capacity requirement information comprises information from which a capacity requirement time measure is calculable for the defined resource for a specified manufacturing order having a specified quantity of product.

14. A computer-implemented method of generating an electronic data structure and populating the data structure with information that models data to be used in planning the execution of a manufacturing process, the method comprising:
   generating, by a computer system, a header structure comprising planned time duration information for a defined planning-level manufacturing operation comprising an aggregation of a defined group of defined execution-level manufacturing operations, the planned time duration information determined from time duration information associated with each of the grouped execution-level manufacturing operations; and
   generating, by the computer system, a resource capacity requirement structure linked to the header structure and comprising planned resource capacity requirement information for a defined planning-level resource, wherein the planned resource capacity requirement information is determined from resource capacity requirement information associated with execution-level resources included in the defined planning-level resource and that are associated with the grouped execution-level operations included in the defined planning-level operation, the capacity requirement structure further comprising planned time refinement information that defines, within the header time duration information, a further refined timeframe during which the defined planning-level resource is estimated to be consumed.

15. The computer-implemented method of claim 14, wherein the planned time refinement information comprises a defined offset for the refined timeframe from one of a starting point in time of the planning-level operation and an ending point in time of the planning-level operation.

16. The computer-implemented method of claim 14, wherein the planned time refinement information comprises a first defined offset for the refined timeframe from a starting point in time of the planning-level operation and a second defined offset for the refined timeframe from an ending point in time of the planning-level operation.

17. The computer-implemented method of claim 14, further comprising generating multiple ones of the resource capacity requirement structure are generated for multiple different defined planning-level resources that are consumed during the defined planning-level operation.

18. The computer-implemented method of claim 14, further comprising generating multiple ones of the header structure, wherein each of the header structures has one or more linked ones of the resource capacity requirement structure.

19. The computer-implemented method of claim 18, further comprising generating an inter-operation timing relationship structure that comprises planned information for a timing relationship between two different defined planning-level operations.

20. The computer-implemented method of claim 19, wherein the planned timing relationship information comprises time relationship information between an ending point in time for a first one of the defined planning-level operations to a starting point in time for a second one of the defined planning-level operations.

* * * * *